United States Patent
Karout et al.

(10) Patent No.: US 11,252,617 B2
(45) Date of Patent: *Feb. 15, 2022

(54) NETWORK NODE, WIRELESS DEVICE AND METHOD FOR USE IN A RANDOM ACCESS PROCEDURE THEREBETWEEN IN A CELL OF THE NETWORK NODE

(71) Applicant: Telefonaktiebolaget LM Ericsson (publ), Stockholm (SE)

(72) Inventors: Johnny Karout, Gothenburg (SE); Johan Rune, Lidingö (SE); Magnus Stattin, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 29 days.

This patent is subject to a terminal disclaimer.

(21) Appl. No.: 16/927,124

(22) Filed: Jul. 13, 2020

(65) Prior Publication Data

US 2020/0344650 A1 Oct. 29, 2020

Related U.S. Application Data

(63) Continuation of application No. 15/541,628, filed as application No. PCT/SE2015/050019 on Jan. 13, 2015, now Pat. No. 10,764,796.

(51) Int. Cl.
*H04W 36/00* (2009.01)
*H04W 76/10* (2018.01)
*H04W 74/08* (2009.01)

(52) U.S. Cl.
CPC ... *H04W 36/0055* (2013.01); *H04W 74/0833* (2013.01); *H04W 76/10* (2018.02)

(58) Field of Classification Search
CPC ......... H04W 36/0055; H04W 74/0833; H04W 76/10

See application file for complete search history.

(56) References Cited

U.S. PATENT DOCUMENTS

2010/0202288 A1  8/2010  Park et al.
2010/0260136 A1* 10/2010  Fan ............... H04W 74/002
                                          370/330

(Continued)

FOREIGN PATENT DOCUMENTS

EP    1973365 A2   9/2008
EP    2442470 A2   4/2012

(Continued)

OTHER PUBLICATIONS

PCT International Search Report and Written Opinion dated Oct. 22, 2015 for International Application No. PCT/SE2015/050019, 9 pages.

(Continued)

*Primary Examiner* — Parth Patel
*Assistant Examiner* — Berhanu D Belete
(74) *Attorney, Agent, or Firm* — Sage Patent Group

(57) ABSTRACT

A network node, a wireless device and methods performed thereby for use in a Random Access, RA, procedure with wireless devices in a cell of the network node are provided. The method includes receiving, from at least two wireless devices, a RA message comprising an RA preamble; transmitting an RA Response, RAR, to the at least two wireless devices, the RAR comprising a TC-RNTI and an RA preamble identifier identifying the received RA preamble; and receiving, from each of said at least two wireless devices, a connection request message comprising a respective S-TMSI. The method includes for a wireless device previously connected to the network node in the same cell, transmitting a connection setup message addressed to a C-RNTI previously assigned to the wireless device; and for a wireless device not previously connected to the network node in the same cell, transmitting, a connection setup message addressed to the TC-RNTI.

8 Claims, 17 Drawing Sheets

(56) References Cited

U.S. PATENT DOCUMENTS

| | | | |
|---|---|---|---|
| 2011/0039541 A1* | 2/2011 | Park | H04W 74/0833 |
| | | | 455/422.1 |
| 2011/0269499 A1 | 11/2011 | Vikberg et al. | |
| 2011/0274040 A1 | 11/2011 | Pani et al. | |
| 2011/0317617 A1 | 12/2011 | Sun et al. | |
| 2013/0279451 A1* | 10/2013 | Park | H04W 74/0833 |
| | | | 370/329 |
| 2013/0301611 A1 | 11/2013 | Baghel et al. | |
| 2014/0079011 A1* | 3/2014 | Wiberg | H04W 74/006 |
| | | | 370/329 |
| 2014/0080503 A1 | 3/2014 | Issakov et al. | |
| 2014/0198729 A1* | 7/2014 | Bostrom | H04W 74/004 |
| | | | 370/328 |
| 2014/0204843 A1 | 7/2014 | Larsson et al. | |
| 2014/0301330 A1* | 10/2014 | Lee | H04W 74/0833 |
| | | | 370/329 |
| 2014/0362794 A1* | 12/2014 | Zhao | H04W 74/04 |
| | | | 370/329 |
| 2015/0016312 A1 | 1/2015 | Li et al. | |
| 2015/0245387 A1* | 8/2015 | Park | H04W 74/0833 |
| | | | 370/329 |
| 2015/0350972 A1 | 12/2015 | Rao et al. | |
| 2016/0100429 A1* | 4/2016 | Bostrom | H04W 24/10 |
| | | | 370/329 |
| 2016/0142981 A1* | 5/2016 | Yi | H04W 52/242 |
| | | | 455/522 |
| 2016/0219475 A1* | 7/2016 | Kim | H04W 28/08 |
| 2016/0219626 A1* | 7/2016 | Martin | H04W 74/085 |
| 2016/0360516 A1* | 12/2016 | Karout | H04W 72/0413 |
| 2017/0164419 A1* | 6/2017 | Kim | H04W 36/04 |
| 2017/0318605 A1* | 11/2017 | Wijetunge | H04L 5/14 |
| 2018/0014331 A1* | 1/2018 | Karout | H04W 74/006 |
| 2019/0268882 A1* | 8/2019 | Baghel | H04L 67/18 |

FOREIGN PATENT DOCUMENTS

| | | |
|---|---|---|
| KR | 20130015963 A | 2/2013 |
| WO | 2008038093 A2 | 4/2008 |
| WO | 2013006111 A1 | 1/2013 |
| WO | 2014065593 A1 | 5/2014 |

OTHER PUBLICATIONS

Huawei Technologies Co Ltd et al., "NB M2M—Random Access Procedure of MAC Layer", 3GPP TSG GERAN #64, GP-140852, San Francisco, USA, Nov. 17-21, 2014, 6 pages.

Supplementary Partial European Search Report dated May 15, 2018 for European Patent Application No. 15878174.0, 5 pages.

* cited by examiner

NETWORK NODE, WIRELESS DEVICE AND METHOD FOR USE IN A RANDOM ACCESS PROCEDURE THEREBETWEEN IN A CELL OF THE NETWORK NODE

CROSS-REFERENCE TO RELATED APPLICATIONS

This application is a U.S. continuation application filed under 37 CFR 1.53(b) claiming priority benefit of U.S. Ser. No. 15/541,628 filed in the United States on Jul. 5, 2017, which claims earlier priority benefit to PCT Patent Application No. PCT/SE2015/050019 filed on Jan. 13, 2015, the disclosures of which are incorporated herein by reference.

TECHNICAL FIELD

The present disclosure relates to wireless communication and in particular to a network node and a wireless device as well as respective method performed by the network node and the wireless device for use in a Random Access, RA, procedure with wireless devices in a cell of the network node.

BACKGROUND

In wireless communication systems, wireless devices may move around within the coverage area of a wireless communication network. In order for a wireless device to communicate with a network node of the communication network, the wireless device needs to be known to the network, be synchronised with the network or the network node. Of course a plurality of other requirements needs to be fulfilled in order for the wireless device being able to communicate with the network.

In order for the wireless device to become known to the wireless communication and/or become synchronised with a network node of the wireless communication, the wireless device generally initiates a random access procedure. The random access procedure generally relies on the statistically low probability that very many wireless devices attempt to access the network simultaneously and that the probability is low that wireless devices that do attempt to access the network simultaneously select the same random access preamble. When such a preamble collision still occurs, the result is at best that one of the wireless devices succeeds to access the network. In the worst case, all the wireless devices using the same preamble in the same random access resource fail to access the network. A wireless device that fails the random access procedure has to restart the procedure. This has several adverse consequences, including increased radio resource consumption i.e. further strain on the random access resources, increased random access load, delayed network access and increased energy consumption in the wireless device.

During the random access procedure, a wireless device may transition from one mode/state to another mode/state, e.g. in Long Term Evolution, LTE, the wireless device may transition from RRC_IDLE state to RRC_CONNECTED state. The access control signalling when going from RRC_IDLE to RRC_CONNECTED state consists of a random access, RA, phase for synchronising with and gaining initial access to the wireless or cellular network and a further phase for authentication, configuring the connection, and establishing appropriate states on higher layers, e.g. through S1AP signalling between the network node, e.g. a eNB in an LTE network, and the Mobility Management Entity, MME and Non-Access Stratum, NAS, signalling between the wireless device, e.g. a User Equipment (UE) and the MME in Evolved Packet System, EPS/LTE. This network access procedure is illustrated in FIG. 1.

As can be seen from FIG. 1, the random access procedure in LTE consists of four steps:

1. The UE transmits a preamble on the Physical Random Access Channel, PRACH. Each cell has its own set of random access preambles (although preambles may be reused between (preferably not adjacent) cells). Optionally the preambles may be divided into two groups, A and B. The UE then selects the group to (randomly) pick a preamble from, based on the potential message size (i.e. the data available for transmission in step three of the random access procedure plus Medium Access Control, MAC, header and any possible MAC control elements) and the channel quality (estimated in terms of the measured downlink path loss). Two conditions have to be met for the UE to select a preamble from preamble group B: the potential message size has to exceed a certain threshold and the estimated path loss has to be lower than a certain threshold.

2. The eNB sends a Random Access Response, RAR to the UE using a broadcast identifier (RA-Radio Network Temporary Identifier, RNTI). As indicated in FIG. 2, the RAR packet Data Unit, PDU, may contain a backoff indicator, BI, and zero or more MAC RAR. Each MAC RAR contains a temporary identifier, a timing advance command, an uplink grant and a reserved bit, R (which is set to zero). The MAC PDU header contains one MAC subheader (Random Access Preamble ID, RAPID, subheader) for each MAC RAR that is included in the RAR PDU. Each such corresponding MAC subheader (RAPID subheader) includes a random access preamble identifier which indicates the received RA preamble that the corresponding MAC RAR pertains to. Hence, in this way each MAC RAR is mapped to a preamble (transmitted by the UE and received by the eNB in step 1) and Physical Random Access Channel, PRACH, resource (see FIGS. 2 and 3).

3. The UE transmits RA Msg3 containing a UE identity (in the RRCConnectionRequest message). Depending on the parameters in the UL grant received in step 2 this message is transmitted 6 or 7 subframes after the reception of the RAR (RA Msg2) in Frequency Division Duplex, FDD, mode. In Time Division Duplex, TDD, mode the timing also depends on the configuration of uplink, UL, and downlink, DL, subframes. The UE identity included in the RRCConnectionRequest message is the System Architecture Evolution—Temporary Mobile Subscriber Identity, S-TMSI, if it is available (which it typically is unless the UE is accessing the network from the DETACHED state), or a 40-bit random number, if no S-TMSI is available. The S-TMSI is a 40-bit temporary identity, which is allocated by the MME and which consists of the MME Group ID, MMEGI, and the MME Code, MMEC.

4. RA Msg3 is echoed in the downlink (together with an RRCConnectionSetup message) to conclude the contention resolution (resolving possible preamble collisions). Specifically, the contention is resolved through the identity contained in the UE Contention Resolution Identity MAC Control Element in RA Msg4. The contention resolution serves to resolve the following potential situation. If two (or more) UEs have happened to use the same random access preamble in the same PRACH resource (in step 1), they will both assume that they are the intended recipient of the Random Access Response (in step 2) and both will consequently send the RRCConnectionRequest message in RA Msg3 to the eNB (in step 3). The eNB will at best correctly receive one of these messages and by including the received UE identity in the response message to the UE (in step 4) the eNB indicates which of the UEs it is responding to.

The fifth message (see FIG. 1), the RRCConnectionSetupComplete message is not really a part of the actual random access procedure (although it is a part of the RRC connection establishment procedure).

FIG. 4 illustrates the format of the UL grant in a MAC RAR. Frequency Hopping, FH, is a frequency hopping flag, which indicates whether frequency hopping should be used for the scheduled UL transmission. The Transmit Power Command, TPC, Command is a power control command for the scheduled UL transmission. In a non-contention based random access procedure the Channel State Information, CSI, Request bit may be used to request a channel quality report in conjunction with the scheduled UL transmission, but in contention based random access the field is reserved (unused). The UL Delay bit indicates one of two possible delays between the RAR and the scheduled UL transmission.

As stated above, two or more UEs may by chance use the same random access preamble in the same PRACH resource, thereby causing a random access collision situation. The risk for random access preamble collisions may be higher when the network access load is high. High access load may occur once in a while because the access load varies with the local circumstances and it is inevitable that access load peaks will occur, either by chance (a number of UEs just happen to attempt to access the network more or less simultaneously) or triggered by a specific situation (e.g. an event that causes a lot of people—and thus UEs—to gather in a relatively small area).

High access load scenarios may also be expected to be more common with the emergence of the connected devices and the vision of ubiquitous deployment of such. According to this vision, the future development of the communication in cellular networks comprises huge numbers of small autonomous devices, which typically, more or less infrequently, e.g. once per week to once per minute, transmit and receive only small amounts of data, or are polled for data. These devices are assumed not to be associated with humans, but are rather sensors or actuators of different kinds, which communicate with application servers (which configure the devices and receive data from them) within or outside the cellular network. Hence, this type of communication is often referred to as machine-to-machine, M2M, communication and the devices may be denoted machine devices, MDs. In the $3^{rd}$ Generation Partnership Project, 3GPP, standardisation the corresponding alternative terms are machine type communication, MTC, and machine type communication devices, MTC devices, with the latter being a subset of the more general term UE.

The reason why realisation of this may be expected to make access load peaks more common is the predicted potentially large numbers of the devices in combination with the fact that a large portion of the devices are expected to be various kinds of sensor devices, whose communication may be triggered by events in the environment. This implies the risk that a large number of sensor devices are triggered by a common event and attempt to access the network more or less simultaneously.

Example scenarios include MTC devices in the form of sensor devices which monitor states of technological systems or processes or sensor devices monitoring various environmental aspects, such as temperature, pressure or vibrations. For such MTC devices (and applications) external events, such as a power grid failure, an earthquake, a pipeline damage or an industrial process failure, may trigger a large amount of relatively densely located MTC devices to attempt to access the cellular network more or less simultaneously for the purpose of reporting the triggering events to their respective application servers. Synchronised access bursts may also be caused by poor design or configuration of applications, e.g. involving synchronised periodic reporting from many MTC devices.

Besides the above described particular access overload/load peak threats seen from MTC devices and MTC applications, overload/load peaks may of course be caused also by regular (non-MTC) UEs, by themselves or in combination with the access load regularly caused by MTC devices. Such overload/load peak situations may thus occur even without extraordinary actions from the MTC devices in a cell. An example of such scenarios can be in a stadium-like environment, where many UEs are trying to access the network.

High access load peaks, or overloading of the access/random access resources can and will thus occur in more or less all parts of the network, unless the PRACH/random access resources are wastefully over dimensioned.

Note that the risk for random access preamble collisions is higher when the network access load is high and in these situations the increased random access load caused by the collisions—and the resulting random access reattempts—is particularly harmful, since it further escalates an already bad situation.

SUMMARY

The object is to obviate at least some of the problems outlined above. In particular, it is an object to provide a network node and a wireless device and respective methods performed thereby for use in a Random Access, RA, procedure with wireless devices in a cell of the network node are provided. These objects and others may be obtained by providing a network node, a wireless device and respective methods performed by a network node, a wireless device according to the independent claims attached below.

According to an aspect, a method performed by a network node for use in a RA procedure with wireless devices in a cell of the network node is provided. The method comprises receiving, from at least two wireless devices, a RA message comprising an RA preamble; transmitting an RA Response, RAR, to the at least two wireless devices, the RAR comprising a TC-RNTI and an RA preamble identifier identifying the received RA preamble; and receiving, from each of said at least two wireless devices, a connection request message comprising a respective System Architecture Evolution, SAE, Temporary Mobile Subscriber Identity, S-TMSI. The method further comprises: for a wireless device previously connected to the network node in the same cell, transmitting a connection setup message addressed to a C-RNTI previously assigned to the wireless device; and for a wireless device not previously connected to the network node in the same cell, transmitting, a connection setup message addressed to the TC-RNTI.

According to an aspect, a method performed by a wireless device for use in an RA procedure with a network node in a cell of the network node is provided. The method comprises transmitting, to the network node, a RA message comprising an RA preamble; receiving from the network node, an RAR, comprising, a TC-RNTI, and an RA preamble identifier identifying the RA preamble; and transmitting, to the network node, a connection request message comprising a S-TMSI. The method further comprises receiving, from the network node, a RA message 4 comprising a connection setup message and the S-TMSI provided in the connection request message, the message being addressed to (a) a C-RNTI previously assigned to the wireless device or (b) the TC-RNTI; and transmitting, to the network node, a Connection Setup Complete message.

According to an aspect, a network node for use in a RA procedure with wireless devices in a cell of the network node is provided. The network node is configured to receive, from at least two wireless devices, a RA message comprising an RA preamble; to transmit an RA Response, RAR, to the at least two wireless devices, the RAR comprising a TC-RNTI and an RA preamble identifier identifying the received RA preamble; and to receive, from each of said at least two wireless devices, a connection request message comprising a respective System Architecture Evolution, SAE, Temporary Mobile Subscriber Identity, S-TMSI. The network node is further configured to: for a wireless device previously connected to the network node in the same cell, transmit a connection setup message addressed to a C-RNTI previously assigned to the wireless device; and for a wireless device not previously connected to the network node in the same cell, transmit, a connection setup message addressed to the TC-RNTI.

According to an aspect, a wireless device for use in an RA procedure with a network node in a cell of the network node is provided. The wireless device is configured to transmit, to the network node, a RA message comprising an RA preamble; to receive from the network node, an RAR, comprising, a TC-RNTI, and an RA preamble identifier identifying the RA preamble; and to transmit, to the network node, a connection request message comprising a S-TMSI. The wireless device is further configured to receive, from the network node, a connection setup message comprising S-TMSI, the message being addressed to (a) a C-RNTI previously assigned to the wireless device or (b) the TC-RNTI; and to transmit, to the network node, a Connection Setup Complete message The method performed by the network node and the wireless device as well as the network node and the wireless device may have several advantages in common. One possible advantage is that fewer failed RA access attempts and a reduced radio access latency may be achieved. Since wireless devices which are known to the network may be differentiated by their S-TMSI, their respective stored C-RNTIs may be used to allocate resources to the these wireless devices, thus avoiding access reattempts during a preamble collision for these wireless devices and this frees up the TC-RNTI which can be used for new wireless devices accessing the network. Further, by increasing the contention resolution efficiency, the PRACH capacity may be better utilised and this allows the handling of high RA intensities. This may facilitate traffic prioritisation/handling by the network which may be crucial in high load and emergency scenarios with many wireless devices trying to acquire transmission resources. In addition, the load on the PUSCH, PDSCH, and PDCCH may be reduced. The freed up PRACH, PDCCH, PDSCH and/or PUSCH resources can be used for other data/signalling instead. In this manner, the RAN achieves an overall better resource efficiency and better performance for the wireless devices. Still further, since the PRACH resources may be more efficiently utilised, operators may be allowed to reduce the amount of radio resources allocated for PRACH. Alternatively, further division of the random access preamble space into subgroups may be facilitated, in order to enable signalling of relevant information already with the preamble (i.e. in RA Message 1), such as data volume pending for uplink transmission, estimated channel quality, wireless device category, etc.

According to an aspect, a method performed by a network node for use in a RA procedure with wireless devices in a cell of the network node is provided. The method comprises receiving, from at least two wireless devices, an RA message comprising an RA preamble; transmitting an RAR to the at least two wireless devices, the RAR comprising a TC-RNTI and an RA preamble identifier identifying the received RA preamble; and receiving, from each of said at least two wireless devices, a connection request message comprising a respective temporary identity. The method further comprises: for at least one of the received connection request messages, transmitting a respective RA4 message to a respective wireless device comprising the respective temporary identity for the wireless device that sent the connection request message, an indication that a plurality of RA4 messages will be transmitted, and (I) a C-RNTI for the wireless device whose temporary identity is comprised in the RA4 message, or (II) a new TC-RNTI, wherein the TC-RNTI that previously was transmitted is promoted to be a C-RNTI for the wireless device whose temporary identity is comprised in the RA4 message.

According to an aspect, a method performed by a wireless device for use in an RA procedure with a network node in a cell of the network node is provided. The method comprises transmitting, to the network node, an RA message comprising an RA preamble; receiving from the network node, an RAR comprising, a TC-RNTI, and an RA preamble identifier identifying the RA preamble; and transmitting, to the network node, a connection request message comprising a temporary identity. The method further comprises receiving, from the network node, a RA4 message comprising the temporary identity, an indication that a plurality of connection setup messages will be transmitted, and (I) a C-RNTI for the wireless device, or (II) a new TC-RNTI, wherein the TC-RNTI that previously was received is promoted to be a C-RNTI for the wireless device; and transmitting, to the network node, a Connection Setup Complete message.

According to an aspect, a network node for use in a RA procedure with wireless devices in a cell of the network node is provided. The network node is configured to receive, from at least two wireless devices, an RA message comprising an RA preamble; to transmit an RAR to the at least two wireless devices, the RAR comprising a TC-RNTI and an RA preamble identifier identifying the received RA preamble; and to receive, from each of said at least two wireless devices, a connection request message comprising a respective temporary identity. The network node is further configured to: for at least one of the received connection request messages, transmit a respective RA4 message to a respective wireless device comprising the respective temporary identity for the wireless device that sent the connection request message, an indication that a plurality of connection setup messages will be transmitted, and (I) a C-RNTI for the wireless device whose temporary identity is comprised in the RA4 message, or (II) a new TC-RNTI, wherein the TC-RNTI that previously was transmitted is promoted to be a C-RNTI for the wireless device whose temporary identity is comprised in the RA4 message.

According to an aspect, a wireless device for use in an RA procedure with a network node in a cell of the network node is provided. The wireless device is configured to transmit, to the network node, an RA message comprising an RA preamble; to receive from the network node, an RAR comprising, a TC-RNTI, and an RA preamble identifier identifying the RA preamble; and to transmit, to the network node, a connection request message comprising a temporary identity. The wireless device is further configured to receive, from the network node, a RA4 message comprising the temporary identity, an indication that a plurality of connection setup messages will be transmitted, and (I) a C-RNTI for the wireless device, or (II) a new TC-RNTI, wherein the TC-RNTI that previously was received is promoted to be a C-RNTI for the wireless device; and to transmit, to the network node, a Connection Setup Complete message.

The method performed by the network node and the wireless device, as well as the network node and the wireless device, may have several advantages in common. By using the identities of the wireless devices, e.g. S-TMSI as the temporary identifier, the network node may differentiate wireless devices colliding on the same preamble and allocating C-RNTIs other than the TC-RNTI allows the network node to successively respond to multiple preamble colliding wireless devices. As a result, fewer failed RA access attempts and reduced radio access latency may be achieved. By increasing the contention resolution efficiency, the PRACH capacity is better utilised and this allows the handling of high RA intensities. This facilitates traffic prioritisation/handling by the network which is crucial in high load and emergency scenarios with many wireless devices trying to acquire transmission resources. In addition, the load on the PUSCH, PDSCH, and PDCCH may be reduced. The freed up PRACH, PDCCH, PDSCH and/or PUSCH resources may be used for other data/signalling instead. In this manner, the RAN achieves an overall better resource efficiency and better performance for the wireless devices.

BRIEF DESCRIPTION OF DRAWINGS

Embodiments will now be described in more detail in relation to the accompanying drawings, in which.

DETAILED DESCRIPTION

Figure 1:
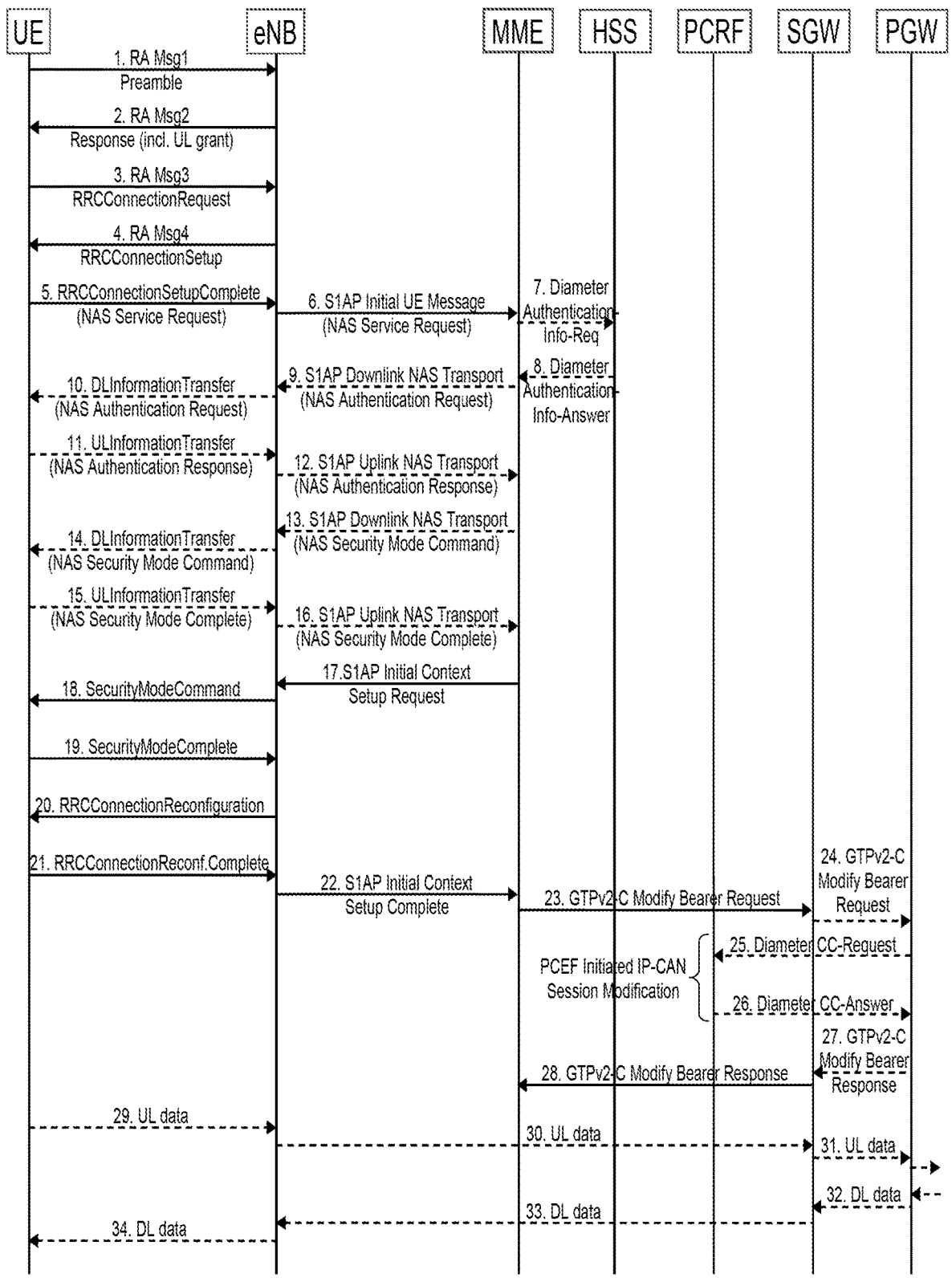
FIG. 1 is a signalling diagram illustrating the message sequence during a network access procedure.
Figure 2:
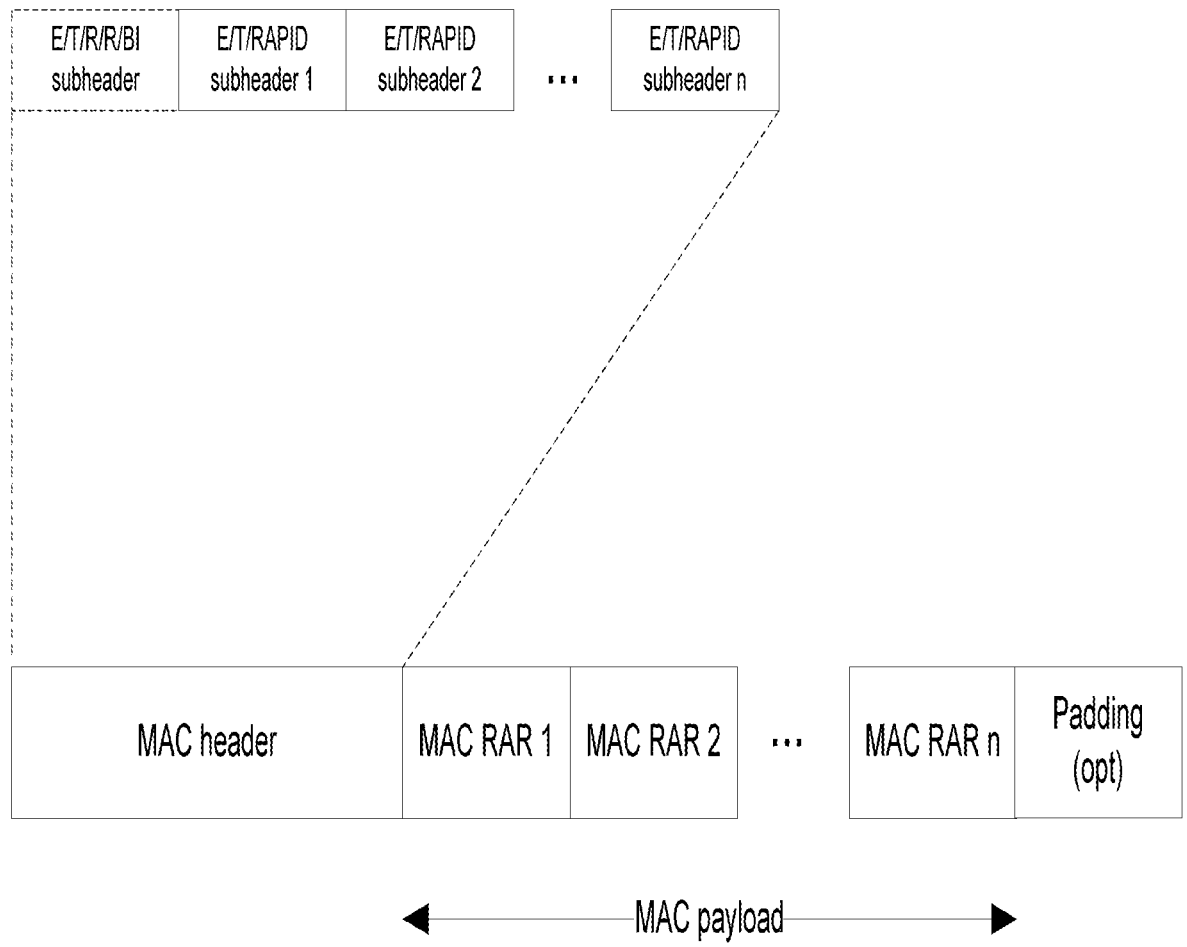
FIG. 2 is an illustration of the format of the Medium Access Control Packet Data Unit, MAC PDU, for a Random Access Response, RAR.
Figure 3:
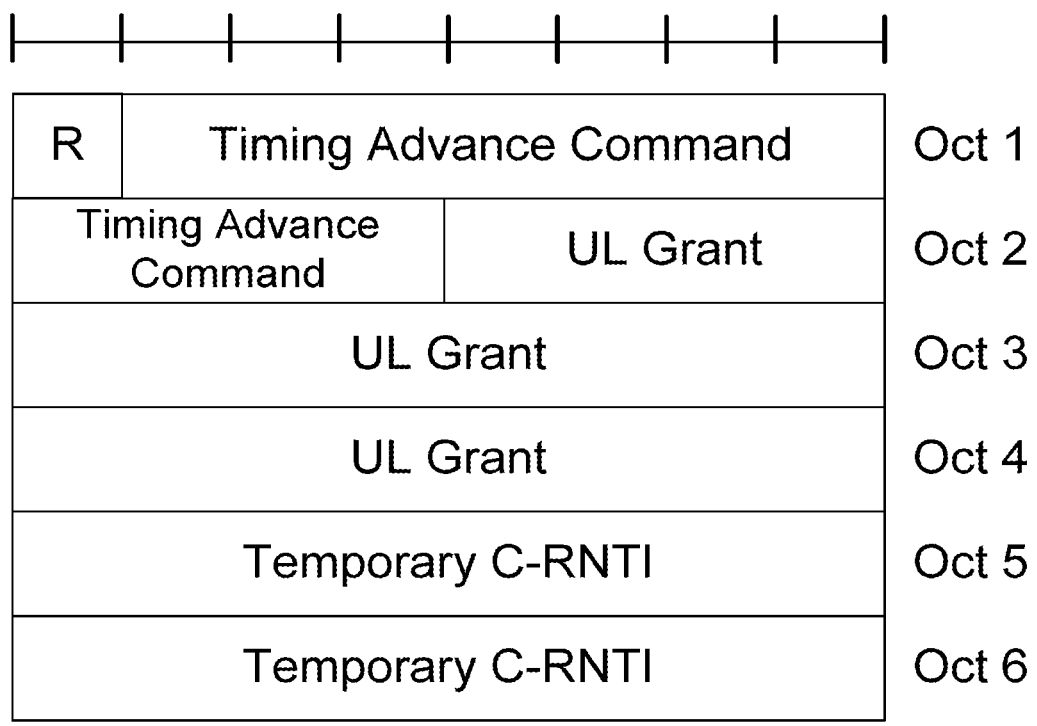
FIG. 3 is an illustration of the format of the MAC RAR.
Figure 4:
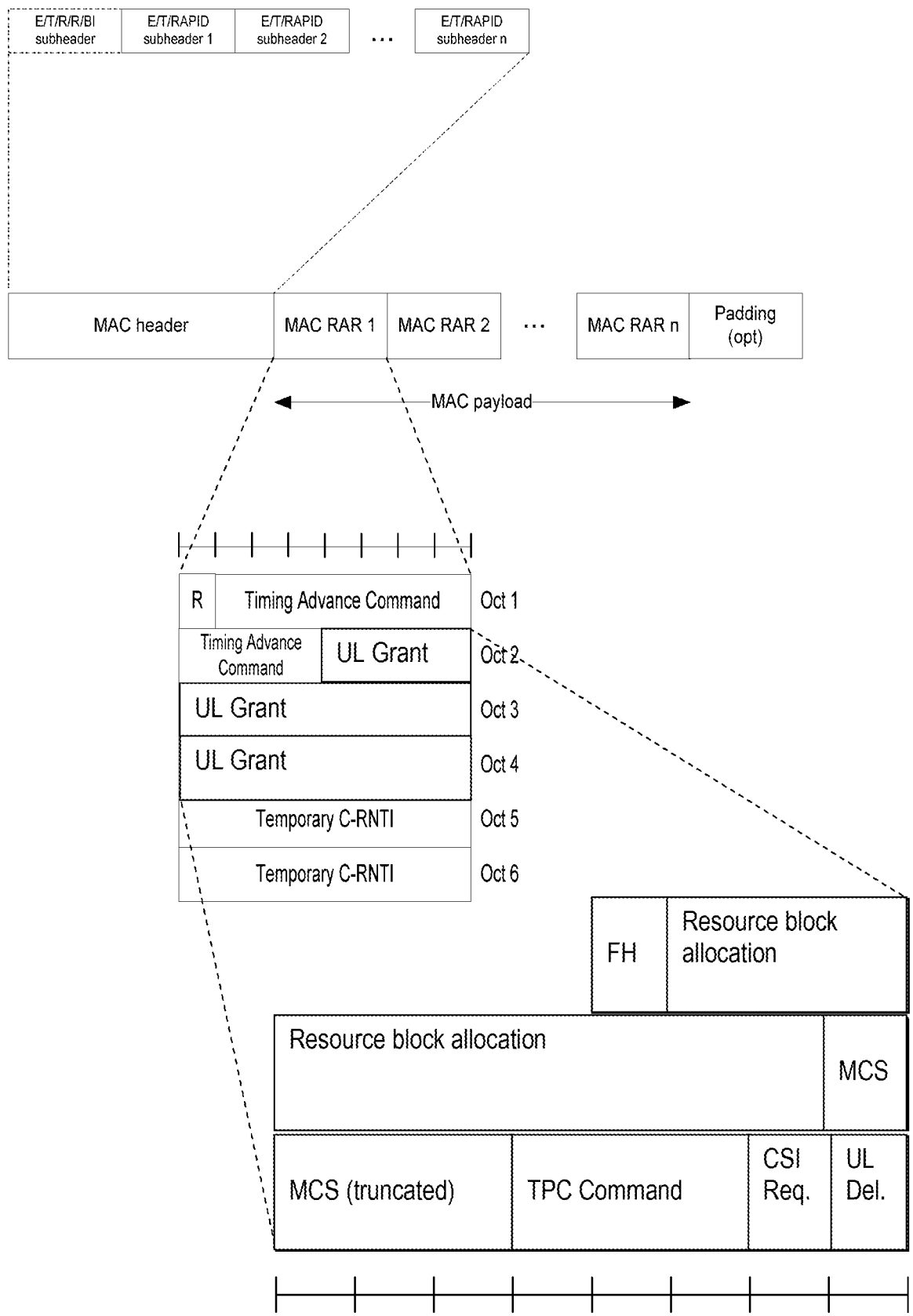
FIG. 4 is an illustration of the uplink grant in the MAC RAR.

Briefly described, a network node and a wireless device and respective methods performed thereby for use in a Random Access, RA, procedure with wireless devices in a cell of the network node are provided. Wireless devices using the same preamble to initiate an RA procedure using the same PRACH resources (i.e. in the same random access time slot) get allocated the same Temporary Cell Radio Network Temporary Identifier, TC-RNTI, during the RAR/RA response. As a result, the wireless devices with the same preamble use the same TC-RNTI to transmit RA Message 3 of the RA procedure. The network node or MME may keep a history of the mappings between S-TMSI and C-RNTI in a mapping table for all the wireless devices which are known to the respective nodes. So in the case where a preamble collision occurs, the network node may use the S-TMSI from RA message 3 to check whether a mapping exits in the mapping table. For the wireless devices which are known to the network, and whose previously used C-RNTI for the current cell can be retrieved from the mapping table, this C-RNTI instead of the TC-RNTI may be used to allocate resources to the wireless devices. This is useful if the base station manages to successfully receive and decode the multiple RA message 3 messages from the preamble colliding wireless devices, e.g., using successive interference cancellation. As for the new wireless devices with the same preamble, at most one wireless device will be granted resources using the TC-RNTI. This results in fewer reattempts of the RA procedure. Alternatively, or additionally, the S-TMSI in RA Message 4 may be complemented with a C-RNTI to be allocated to the wireless device addressed by the S-TMSI to be used instead of the TC-RNTI. This ensures that the wireless device will not listen to the TC-RNTI anymore, so that the TC-RNTI can be used when transmitting the response(s) to the other preamble colliding wireless device(s). This RA Message 4 may also contain a flag indicating to the other preamble colliding wireless device(s) that the network node intends to send more RA Message 4 messages addressed to the same TC-RNTI to cater for the remaining wireless device(s). Thus, the network node will transmit an RA Message 4 addressed to the TC-RNTI, intended for one wireless device, which intended wireless device is indicated by including the S-TMSI of the wireless device (e.g. in the UE Contention Resolution Identity MAC Control Element in LTE), allocate a new C-RNTI to this specific wireless device, and this message also carries a flag indicating to other wireless devices with the same preamble to listen to following RA Message 4 messages addressed to the same TC-RNTI but intended for those other wireless devices. This allows the network node to accommodate the wireless devices with the same preamble without them having to repeat an RA procedure due to preamble collisions.

In this disclosure, the non-limiting term radio network node or simply network node is used. It refers to any type of network node that serves wireless devices and/or is connected to other network node(s) or network element(s) or any radio node from where the wireless device receives signal(s). Examples of network nodes are Node B, Base Station, BS, Multi-Standard Radio, MSR, node such as MSR BS, eNodeB, eNB, network controller, Radio Network Controller, RNC, Base Station Controller, BSC, relay, donor node controlling relay, Base Transceiver Station, BTS, Access Point, AP, transmission points, transmission nodes, Remote Radio Unit, RRU, Remote Radio Head, RRH, nodes in Distributed Antenna System, DAS.

Further in this disclosure, the non-limiting term wireless device is used. It refers to any type of wireless device that communicates with a radio network node in a cellular or mobile communication system. Examples of a wireless device are a UE, target device, Device to Device, D2D, machine type UE or UE capable of Machine to Machine, M2M, communication, Personal Digital Assistant, PDA, iPAD, Tablet, mobile terminals, smart phone, Laptop Embedded Equipped, LEE, Laptop Mounted Equipment, LME, USB dongles, connected wearables such as watches for example, vehicles comprising means for communicating with e.g. network nodes etc.

Still further, in this disclosure, the two notations "RA message X" and "RAX message" will be used interchangeably in the document, e.g. RA message 4 and RA4 message.

The random access procedure relies on the statistically low probability that very many wireless devices attempt to access the network simultaneously and that the probability is low that wireless devices that do attempt to access the network simultaneously select the same random access preamble. When such a preamble collision still occurs, the result is at best that one of the wireless devices succeeds to access the network. In the worst case, all the wireless devices using the same preamble in the same random access (PRACH) resource fail to access the network. A wireless device that fails the random access procedure has to restart the procedure. This has several adverse consequences, including increased radio resource consumption (i.e. further strain on the random access resources), increased random access load, increased processing load in the base station, delayed network access and increased energy consumption in the wireless device.

Note that the risk for random access preamble collisions is higher when the network access load is high and in these situations the increased random access load caused by the collisions—and the resulting random access reattempts—is particularly harmful, since it further escalates an already bad situation. And as mentioned above, the frequency of high access load situations are likely to increase rather than decrease in the future. A way to mitigate the problem is to allocate more random access (PRACH) resources, but since these additional resources will be needed only a fraction of the time, it is a waste of precious radio resources.

Embodiments of a method performed by a network node for use in a RA procedure with wireless devices in a cell of the network node will now be described with reference to FIGS. 5a-5c.

Figure 5A:
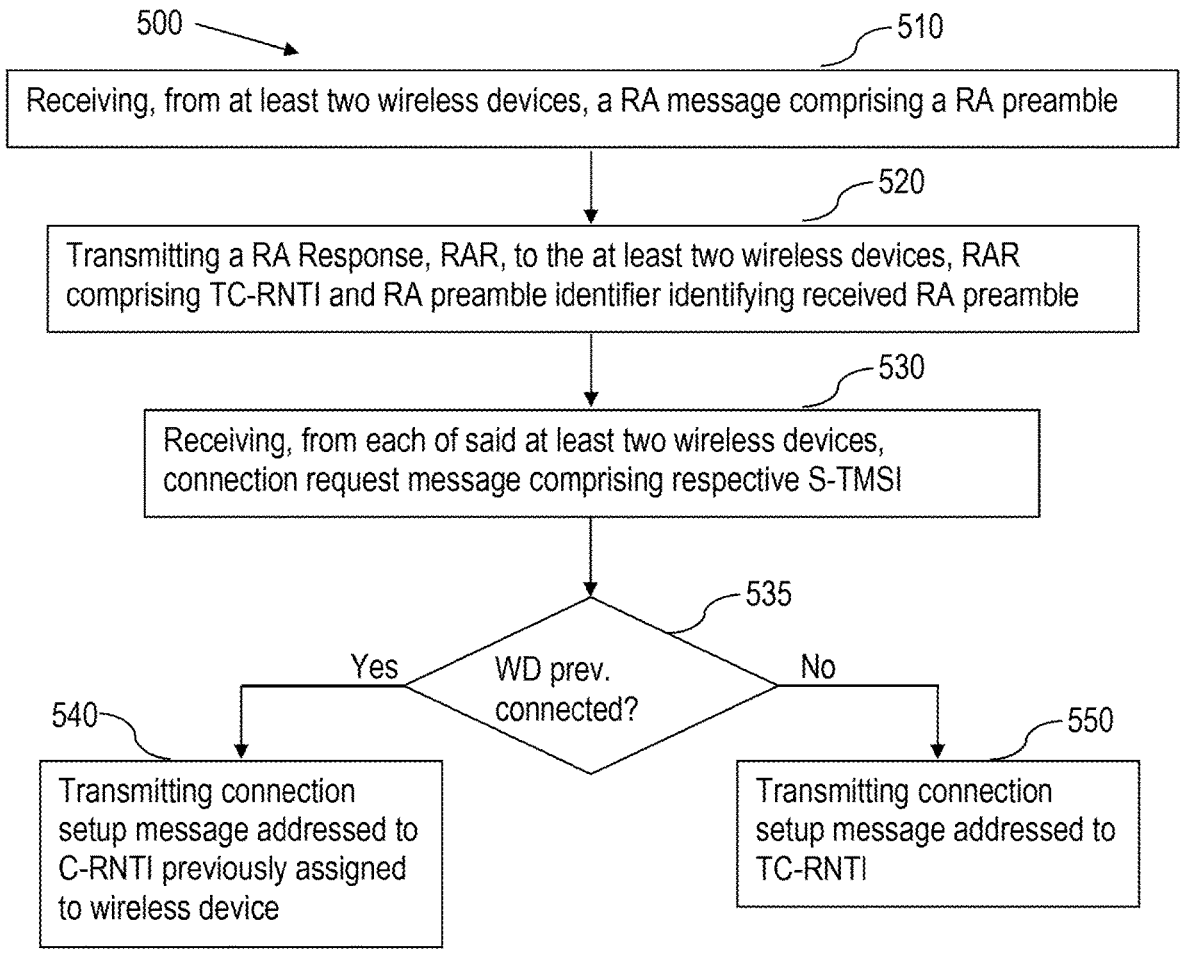
FIG. 5a is a flowchart of a method performed by a network node for use in a Random Access, RA, procedure with wireless devices in a cell of the network node according to an exemplifying embodiment.

FIG. 5a illustrates the method 500 comprising receiving 510, from at least two wireless devices, a RA message comprising an RA preamble; transmitting 520 an RA Response, RAR, to the at least two wireless devices, the RAR comprising a TC-RNTI and an RA preamble identifier identifying the received RA preamble; and receiving 530, from each of said at least two wireless devices, a connection request message comprising a respective identifier previously allocated by the core network, e.g. a System Architecture Evolution, SAE Temporary Mobile Subscriber Identity, S-TMSI. The method further comprises for a wireless device previously connected to the network node in the same cell, transmitting 540 a connection setup message addressed to a C-RNTI previously assigned to the wireless device in the concerned cell; and for a wireless device not previously connected to the network node in the same cell, transmitting 545, a connection setup message addressed to the TC-RNTI.

When the network node receives the RA messages comprising the RA preamble, the network node may not be aware that it has received a plurality of RA messages all having the same RA preamble and all being transmitted on the same RA resource, i.e. the same PRACH resource. To the network node, it may look as if only one RA message has been received comprising the RA preamble and received on a PRACH resource. The PRACH resource may be for example 6 Resource Blocks, 1.08 MHz in the frequency domain and 1, 2 or 3 ms in the time domain depending on the format.

In response to the received RA messages comprising the RA preamble, the network node transmits the RAR, to the at least two wireless devices, the RAR comprising the TC-RNTI and the RA preamble identifier identifying the received RA preamble. In order for the network node to transmit the RAR to the at least two wireless devices, the network node may use the broadcast identifier RA-RNTI. Thus all wireless devices, i.e. the at least two wireless devices, which transmitted the RA message comprising the RA preamble will be listening for the RAR. Once the RAR is transmitted from the network node, every wireless device expecting to receive the RAR will assume it is intended for itself. Thus so far, the network node may be unaware that there is a plurality of wireless devices having sent the same RA message comprising the RA preamble on the same PRACH resource. Further, the wireless devices which have sent the RA message comprising the preamble are also unaware that any other wireless device has sent the same RA message comprising the RA preamble on the same PRACH resource.

Since all, i.e. the at least two in this example, wireless devices assume the RAR is intended for themselves and that the TC-RNTI in the RAR is theirs, all wireless devices will respond to the RAR. Each wireless device will thus send a connection request message comprising its respective S-TMSI to the network node.

The network node receives each of the connection request messages comprising the respective S-TMSI of the wireless devices that sent the messages. Correct demodulation and decoding of the multiple simultaneous connection request messages maybe achieved e.g. through the aid of successive interference cancellation and advanced antenna techniques. The network node may at this point understand that there is a collision since several connection request messages are received.

The network node may then look at the at least two different S-TMSIs that are received in the at least two received connection request messages. It may be that at least one of the wireless devices previously have been connected to, or served by, the network node. In other words, such a wireless devices can be said to be known to the network node in the cell. It shall be pointed out that a network node may be associated with a plurality of cells, wherein the method may be performed on a per cell basis. If the wireless device previously has been connected to the network node in the same cell, then the network node has previously assigned a C-RNTI to the wireless device for the same cell. Thus, the network node transmits, to such a wireless device, the connection setup message addressed to a C-RNTI previously assigned to the wireless device.

For example, assume that wireless device WD1 previously has been connected to the network node in the same cell and have been allocated C-RNTI-1 at that time. Assume further that also wireless device WD2 previously has been connected to the network node in the same cell and have been allocated C-RNTI-2 at that time. The network node will thus send two separate RA message 4 messages (including connection setup messages), one addressed to C-RNTI-1 and one addressed to C-RNTI-2. WD1 and WD2 will automatically understand when they are addressed by the respective RA message 4 message/connection setup message.

For a wireless device not previously connected to, or served by, the network node, no previous C-RNTI has been allocated such a wireless device in the cell. Thus, for such a wireless device the network node transmits the connection setup message addressed to the TC-RNTI. Since the TC-RNTI was used by the network node when transmitting the RAR, the wireless device receiving the connection setup message addressed to the TC-RNTI will assume it is intended for the wireless device.

Following the example above, assume further that a third wireless device WD3 previously has not been connected to the network node in the same cell, and has transmitted the same RA message comprising the RA preamble on the same PRACH resource as WD1 and WD2. For WD3, the network node may transmit the RA message 4 message/connection setup message addressed to the TC-RNTI, thereby enabling also the third wireless device to become connected to the network node.

Thus, by transmitting respective RA message 4 message(s)/connection setup message(s) addressed to the respective C-RNTI previously assigned to the respective wireless device(s) for wireless device(s) previously connected to the network node in the same cell; and by transmitting a RA message 4 message/connection setup message addressed to the TC-RNTI for a wireless device not previously connected to the network node in the same cell, the network node is enabled to handle colliding RA requests.

The method may have several advantages. One possible advantage is that fewer failed RA access attempts and reduced radio access latency may be achieved. Since wireless devices which are known to the network may be differentiated by their S-TMSI, their respective stored C-RNTIs may be used to allocate resources to the these wireless devices, thus avoiding access reattempts during a preamble collision for these wireless devices and this frees up the TC-RNTI which can be used for new wireless devices accessing the network. Further, by increasing the contention resolution efficiency, the PRACH capacity may be better utilised and this allows the handling of high RA intensities. This may facilitate traffic prioritisation/handling by the network which may be crucial in high load and emergency scenarios with many wireless devices trying to acquire transmission resources. In addition, the load on the PUSCH, PDSCH, and PDCCH may be reduced. The freed up PRACH, PDCCH, PDSCH and/or PUSCH resources can be used for other data/signalling instead. In this manner, the RAN achieves an overall better resource efficiency and better performance for the wireless devices. Still further, since the PRACH resources may be more efficiently utilised, operators may be allowed to reduce the amount of radio resources allocated for PRACH. Alternatively, further division of the random access preamble space into subgroups may be facilitated, in order to enable signalling of relevant information already with the preamble (i.e. in RA Message 1), such as data volume pending for uplink transmission, estimated channel quality, wireless device category, etc.

The method may further comprise determining that a wireless device was previously connected to the network node in the same cell if a mapping exists, in a mapping table, between the S-TMSI (or the identifier previously allocated by the core network) and the C-RNTI.

The network node may have access to a mapping table, either internally in a memory coupled to or comprised in the network node or externally, for example in the MME. The history of the mappings between S-TMSI and C-RNTI may thus be stored in a mapping table for all the wireless devices which are known to the respective nodes (e.g. the network node in case the mapping table is stored therein or the MME in case the mapping table is stored in the MME). Wireless devices known to the network are, for example, wireless devices which have carried out an initial Attach, moved from RRC_IDLE to RRC_CONNECTED state, or vice versa. Note that a C-RNTI is unique within a cell while an S-TMSI is unique within an MME pool.

The method may still further comprise assigning 552 a C-RNTI to the wireless device not previously connected to the network node in the same cell and creating 553 a mapping between the S-TMSI and the C-RNTI for the wireless device.

Once the previously unknown wireless device, i.e. any wireless device not previously being connected to the network node in the same cell, has become connected to the network node, e.g. using the TC-RNTI, the TC-RNTI may be promoted to be a C-RNTI for the previously unknown wireless device, whereby the network node assigns the C-RNTI to the wireless device. Alternatively, the wireless device is assigned a new C-RNTI other than the TC-RNTI. Since the previously unknown wireless device now is known to the network node, the network node creates the mapping between the S-TMSI and the C-RNTI for the wireless device.

In this manner, in case the wireless device becomes disconnected from the network node in the cell at some point in time, and subsequently at a later point in time initiates a RA procedure by transmitting an RA message comprising an RA preamble and subsequently an RA message 3 comprising the S-TMSI, the network node may consult the mapping table and there find the C-RNTI previously assigned to the wireless device.

The method may yet further comprise, updating 554 the mapping table with the created mapping, and/or, transmitting 555 the created mapping to an MME.

Once the mapping has been created, it should be inserted into the mapping table. As described above, the mapping table may be stored in the network node or in the MME.

In case the mapping table is stored, or comprised, in the network node, the network node may simply update the mapping table. In case the mapping table is stored, or comprised, in the MME, the network node transmits the mapping to the MME.

Further, the method may comprise starting a timer, and when the timer lapses, deleting 562 the mapping between the S-TMSI and the C-RNTI for that wireless device from the mapping table.

As stated above, a C-RNTI is unique within a cell of a network node. The wireless devices may move around between cells and thus their number of mappings will in time grow very large. The older a mapping in the mapping table, the less likely it may be of future use. Consequently, in order to keep the number of mappings in the mapping table from growing out of hand, the network node may start a timer, e.g. when a wireless device transitions to an IDLE state or mode, or leaves the cell and thus no longer is connected to the network node in the cell. When the timer lapses, the network node deletes the mapping between the S-TMSI and the C-RNTI for that wireless device in that cell from the mapping table. The length of the timer may be set dynamically or statically, e.g. via an Operation, Administration and Maintenance, OAM, system.

According to an embodiment, the method further comprises, when a wireless device is handed over to a target network node, transferring 557i, 557ii the S-TMSI to: (i) the target network node during X2 handover, or (ii) a MME during S1 handover.

A wireless device may undergo different types of handover, e.g. X2 handover or S1 handover. At a handover to a new cell the wireless device is typically allocated a dedicated preamble in the RRCConnectionReconfiguration message triggering the wireless device to execute the handover. The wireless device is thus guaranteed to avoid preamble collision when it performs the random access in the new cell. The wireless device is also allocated a new C-RNTI in the same message. During an X2 handover the dedicated preamble and the new C-RNTI are both transferred from the target network node to the source network node in the X2AP message Handover Request Acknowledge. During an S1 handover the target network node transfers the dedicated preamble and the new C-RNTI to the MME in the S1AP message Handover Request Acknowledge and the MME forwards them to the source network node in the S1AP message Handover Command (in the Target to Source Transparent Container Information Element, IE). The C-RNTI is thus already allocated to the wireless device in the new cell.

If the wireless device being handed over is not allocated a dedicated preamble (which is optional for the target network node to do), the wireless device will be vulnerable to preamble collisions in the new cell. However, since the wireless device already has a C-RNTI in the new cell, it may provide this C-RNTI in the C-RNTI MAC Control Element in RA Message 3 (i.e. in the MAC PDU carrying the RRCConnectionReconfigurationComplete message the wireless device sends in the resources allocated in the Random Access Response), and so the target network node will know which wireless device that sent the RA Message 3. In addition, the wireless device will not include an RRCConectionRequest message in RA Message 3, but an RRCConnectionReconfigurationComplete message which will further separate the wireless device from potential colliders. Hence, the wireless device being handed over is not subject to RA Message 4 (i.e. the RRCConnectionSetup message) and the inventive mechanisms associated with it.

To enable the mechanism to continue to work in the target network node, the source network node may transfer the S-TMSI to the target network node in conjunction with the handover. During an X2 handover the S-TMSI may be transferred in the X2AP message Handover Request. During an S1 handover the source network node may transfer the S-TMSI to the MME in the S1 AP message Handover Required and the MME may forward it to the target network node in the S1 AP message Handover Request (in the Source to Target Transparent Container IE). When receiving the S-TMSI, the target network node may check if it is present in the mapping table associated with the target cell. If this is the case, the target network node may choose to allocate the wireless device's previously allocated C-RNTI (i.e. the one found in the mapping table) to the wireless device (by transferring it to the wireless device via the source network node as described above). If the target network node chooses to allocate another C-RNTI than the one stored in the mapping table, the target network node replaces the wireless device's old C-RNTI with the new one in the mapping table. If the target network node does not find the S-TMSI in the mapping table, the target network node may store the S-TMSI and the allocated C-RNTI as a new entry in the mapping table for the concerned cell. If the handover is an intra-network-node handover (i.e. a handover between two cells served by the same network node), the whole procedure involving the mapping tables becomes network node internal.

The method may further comprise prioritising between wireless devices when receiving 530, from each of the at least two wireless devices, the connection request message comprising a respective S-TMSI, wherein the prioritisation is based on at least one of (a) establishment cause, (b) estimated channel quality, (c) estimated timing advance, and (d) travelling speed of the wireless device.

The prioritisation as such may consist of choosing the order in which the wireless devices are responded to with RA message 4. There may be several reasons for the network node to prioritise between different wireless devices. The wireless device may indicate (a) establishmentCause IE in the RRCConnectionRequest message. The network node may e.g. prioritise wireless devices which provided an establishmentCause IE set to 'emergency' and/or wireless devices which provided an establishmentCause IE set to 'highPriorityAccess', while wireless devices which provided an establishmentCause IE set to 'delayTolerantAccess-v1020' are given low priority.

The network node may also take (b) estimated channel quality into account. For example, the network node may choose to serve the wireless devices with the best estimated channel quality. Further, the network node may look at (c) the estimated timing advance. The network node may e.g. choose to serve the wireless devices with the smallest timing advance, assumedly being closer to the antenna site.

Additionally and/or alternatively, the network node may take consideration to (d) the travelling speed of the wireless device. If the speed of the wireless device can be estimated, e.g. based on Doppler shift measurements, then the network node may e.g. choose to prioritise wireless devices with low speed (based on the assumption that high speed wireless devices are more likely to leave the cell soon).

Another example of a factor that the network node may take consideration is positioning information of the wireless device.

Figure 6A:
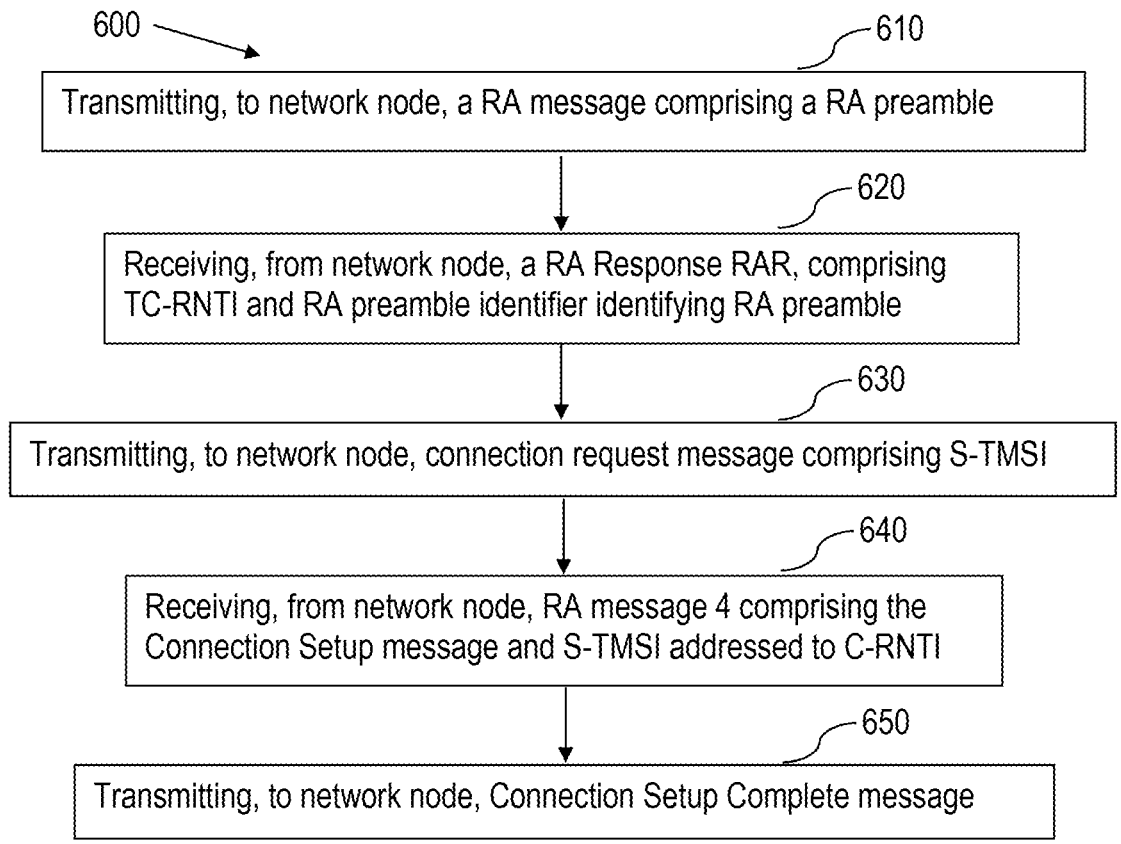
FIG. 6a is a flowchart of a method performed by wireless device for use in an RA procedure with a network node in a cell of the network node according to an exemplifying embodiment.

Embodiments herein also relate to method 600 performed by a wireless device for use in an RA procedure with a network node in a cell of the network node. Embodiments of such a method will now be described with reference to FIGS. 6a and 6b. FIG. 6a illustrates the method comprising transmitting 610, to the network node, a RA message comprising an RA preamble; receiving 620 from the network node, an RAR, comprising, a TC-RNTI, and an RA preamble identifier identifying the RA preamble; and transmitting 630, to the network node, a connection request message comprising a S-TMSI. The method further comprises receiving 640, from the network node, a RA message 4 comprising a connection setup message and the S-TMSI provided in the connection request message, the message being addressed to (a) a C-RNTI previously assigned to the wireless device or (b) the TC-RNTI; and transmitting 650, to the network node, a Connection Setup Complete message.

The wireless device is unaware of possible other wireless devices transmitting the same RA message comprising the same RA preamble on the same RA resource. Consequently, the wireless device will receive the RAR comprising the TC-RNTI and assume it is intended for it, unaware of the RAR being received by other wireless devices also making the same assumption. The wireless device will thus transmit the connection request message comprising the S-TMSI to the network node and wait/listen for the RA message 4 message comprising the connection setup message and the S-TMSI addressed to either the C-RNTI previously assigned to the wireless device in the same cell or the TC-RNTI. Once the wireless device receives the connection setup message, the wireless device is connected to the network node and thus transmits the Connection Setup Complete message to the network node.

The wireless device has stored previously C-RNTIs which have been allocated to the wireless device for individual cells. In this manner, the wireless device does not only listen for the RA message 4 comprising the connection setup message and the S-TMSI addressed to the TC-RNTI, the TC-RNTI being the one that was received in the RAR. Instead, the wireless device listens for the RA message 4 comprising the connection setup message and the S-TMSI also addressed to the C-RNTI that was previously assigned to the wireless device when it was previously connected to the network node in the same cell.

The method performed by the wireless device may have the same advantages as the method performed by the network node. One possible advantage is that fewer failed RA access attempts and reduced radio access latency may be achieved. Since wireless devices which are known to the network may be differentiated by their S-TMSI, their respective stored C-RNTIs may be used to allocate resources to the these wireless devices, thus avoiding access reattempts during a preamble collision for these wireless devices and this frees up the TC-RNTI which can be used for new wireless devices accessing the network. Further, by increasing the contention resolution efficiency, the PRACH capacity may be better utilised and this allows the handling of high RA intensities. This may facilitate traffic prioritisation/handling by the network which may be crucial in high load and emergency scenarios with many wireless devices trying to acquire transmission resources. In addition, the load on the PUSCH, PDSCH, and PDCCH may be reduced. The freed up PRACH, PDCCH, PDSCH and/or PUSCH resources can be used for other data/signalling instead. In this manner, the RAN achieves an overall better resource efficiency and better performance for the wireless devices. Still further, since the PRACH resources may be more efficiently utilised, operators may be allowed to reduce the amount of radio resources allocated for PRACH. Alternatively, further division of the random access preamble space into subgroups may be facilitated, in order to enable signalling of relevant information already with the preamble (i.e. in RA Message 1), such as data volume pending for uplink transmission, estimated channel quality, wireless device category, etc.

The method may further comprise, when the received connection setup message is addressed to the TC-RNTI, storing 660 the TC-RNTI as a C-RNTI for the wireless device.

When the wireless device does not have a previously assigned C-RNTI for the cell stored, then the wireless device may only receive the received RA message 4 comprising the connection setup message and the S-TMSI addressed to the TC-RNTI. If this is the case, once the wireless device receives the RA message 4 comprising the connection setup message addressed to the TC-RNTI, the wireless device is known to the network node in the cell. When the wireless device receives a RA message 4 addressed to the TC-RNTI and comprising the S-TMSI of the wireless device, the TC-RNTI is promoted to a C-RNTI for the wireless device and the wireless device then stores the C-RNTI for the wireless device for the cell of the network node for which is was assigned. Thus the TC-RNTI is promoted to the C-RNTI and a mapping is done between this C-RNTI and the S-TMSI provided by the wireless device to which the C-RNTI is allocated.

Thus, should the wireless device leave the cell or transition to an IDLE state or mode e.g. the RRC_IDLE state, the wireless device may subsequently either re-visit the cell or want to transition to a CONNECTED state, e.g. the RRC_CONNECTED state, which may require performing an RA procedure. Thus, when subsequently performing an RA procedure towards the network node for the same cell, the wireless device may listen for the RA message 4 comprising the connection setup message and the S-TMSI also addressed to the C-RNTI that was previously assigned to the wireless device when it was previously connected to the network node in the same cell.

The method may further comprise starting 661 a timer and when the timer lapses, deleting 663 the stored C-RNTI.

As for the network node, the number of different C-RNTIs being assigned to the wireless devices in different cells may grow very large. The wireless device may store the C-RNTIs in a table similar to the mapping table described above. The older the C-RNTI in the table, the less likely it may be that it may be used in the near future. Consequently, in order to keep the number of stored C-RNTIs in the table from growing out of hand, the wireless device may start a timer, e.g. when the wireless device transitions to the IDLE state or mode (e.g. the RRC_IDLE state, or leaves the cell and thus no longer is connected to the network node in the cell. When the timer lapses, the wireless device may delete the C-RNTI for that wireless device in that cell from the table. The length of the timer may be set dynamically or statically, e.g. via RRC signalling from the network node.

By means of the above described embodiments, the network node may use the S-TMSI extracted from RA Message 3 to check whether a mapping exits between the S-TMSI and a previously allocated C-RNTI in the mapping table. This could be done for all the S-TMSIs corresponding to all the wireless devices initiating an RA procedure with the same preamble (i.e. the S-TMSIs received in RRCConnectionRequest messages in RA Message 3:s that were received in the same resource, i.e. the resource assigned in the uplink grant included in Random Access Response). Therefore, the network node could accept all the wireless devices into the network by addressing these wireless devices using their respective C-RNTI instead of the TC-RNTI, when transmitting their respective RRCConnectionSetup messages, knowing that the wireless devices have saved and remember their previously allocated C-RNTI. If the S-TMSIs of all the wireless devices are found in the mapping table, the network node may use the respective C-RNTIs to address all the wireless devices, or optionally use the TC-RNTI when sending the RRCConnectionSetup message (RA Message 4) to the last wireless device. Otherwise, if only a subset of the wireless devices provided an S-TMSI for which a corresponding C-RNTI was found in the mapping table, only this subset is addressed with their respective C-RNTI, while the TC-RNTI can be used to address (and successfully conclude the RA procedure for) at most one of the remaining wireless devices that have initiated the RA procedure with the same preamble. Any wireless device which is still left without a response to RA Message 3 will need to repeat the RA procedure. Note that this scheme assumes that the wireless device remembers its allocated C-RNTI while it is in RRC_IDLE state.

In the embodiment where the S-TMSI-C-RNTI mapping table is stored in the network node, the network node maintains one such table for each of the cells it serves (since the C-RNTI is unique within only one cell). Optionally, these different mapping tables may be implemented as a single mapping table with indications of the concerned cell associated with each S-TMSI-C-RNTI mapping in the table. When the network node receives an RRCConnectionRequest message with an S-TMSI, the network node proceeds with different actions depending on the situation.

If the wireless device that sent the RRCConnectionRequest message is involved in a preamble collision (as determined by the network node e.g. through the reception of multiple RA Message 3:s in the same resource, i.e. the resource assigned in the uplink grant in the Random Access Response), the network node checks if the S-TMSI is included in the mapping table and: (i) If the S-TMSI is found in the mapping table, the network node acts as described above to be able to serve multiple preamble colliding wireless devices (i.e. it may choose to use the C-RNTI associated with the S-TMSI in the mapping table to address the wireless device). (ii) If the S-TMSI is not found in the mapping table, the network node may still be able to serve the wireless device, since, as described above, one of the preamble colliding wireless devices may be served using the TC-RNTI. If this wireless device is being served and thus allocated the TC-RNTI as its C-RNTI, the network node stores the S-TMSI and the allocated C-RNTI (i.e. the promoted TC-RNTI) as a new entry in the mapping table for the concerned cell. If the wireless device is not served, the mapping table is left unchanged.

If the wireless device that sent the RRCConnectionRequest message is not involved in a preamble collision, the network node serves it according to regular procedures and thus the TC-RNTI is promoted to be the wireless device's allocated C-RNTI. The network node then stores the S-TMSI and the allocated C-RNTI (i.e. the promoted TC-RNTI) as a new entry in the mapping table for the concerned cell. Optionally, as an alternative, the network node may choose to serve even a wireless device that is not involved in a preamble collision according to the novel procedure, i.e. using a previously allocated C-RNTI found in a mapping table based on the S-TMSI of the concerned wireless device.

In the embodiment where the mapping table is stored at the MME, the network node would inform the MME when allocating a C-RNTI to a wireless device. The network node preferably does this by sending the C-RNTI to the MME together with the S-TMSI in the S1AP message "Initial UE Message", but it may also do it in a later S1AP message, such as the Initial Context Setup Response message or an Uplink NAS Transfer message.

When the network node during a subsequent random access procedure involving the same wireless device, receives a RRCConnectionRequest message including an S-TMSI and wants to map the S-TMSI to an old C-RNTI (if there is one), it will have to interrogate the MME before sending the RRCConnectionSetup (i.e. a new S1AP procedure) to retrieve the C-RNTI previously used by the wireless device, instead of retrieving it from a local database. The MME would obviously have to maintain a separate S-TMSI/C-RNTI database (also called mapping table) for each cell, so that it does not return a C-RNTI that the wireless device used in another cell. Optionally, these different databases may be implemented as a single database with indications of the concerned cell associated with each S-TMSI-C-RNTI mapping in the database. The conditions for a "hit" in the database are that the cell is one that the wireless device was reasonably recently connected in and that the C-RNTI has not timed out of the database. Note that in order for this to work a mobile wireless device would have to remember the C-RNTIs of multiple cells it has recently been connected in; each one would time out with a separate timer (and this will be needed also if the S-TMSI<->C-RNTI mapping is stored in the network node). The above mechanism works as long as the wireless device remains in the coverage area of the same (or an overlapping) MME pool. The S-TMSI is inherently unique only within a single MME pool (and through configuration unique among overlapping MME pools). This limitation applies to both embodiments, i.e. both when the S-TMSI-C-RNTI mapping table is stored in the network node and when it is stored in the MME. MME pool coverage areas are typically very large and MME pool changes are rare. Still, they do occur and some mechanisms for dealing with these cases are discussed below.

To support interoperability between wireless devices and networks which implement the invention and wireless devices and networks which do not implement the invention or do not understand the associated signalling, mappings between S-TMSIs and C-RNTIs may be stored only for wireless devices which implement the invention or understands the associated signalling. Thus, based on the presence of a mapping entry, the network will know whether signalling pertaining to the invention is supported/understood by the relevant wireless device and is safe to use towards that wireless device. Alternatively the network can, associated with the mapping between S-TMSI and C-RNTI, store an indication of whether or not and/or to what extent the wireless device supports the invention and/or associated signalling. Prior to establishing an RRC Connection to a cell for the first time, the network controlling the wireless device and/or the cell may not know the capabilities of the wireless device; e.g. which functionality and/or signalling is supported/understood by the wireless device. After establishing an RRC Connection, a network node should obtain the wireless device capabilities from a copy stored in the Core Network or by inquiring the wireless device. The network node can send wireless device capabilities acquired from the wireless device to the Core Network where they can be stored. Once the capabilities of the wireless device are known the network can ensure interoperability between wireless devices and networks which implement the invention and wireless devices and networks which do not implement the invention; e.g., by means of using the invention and/or associated signalling only towards wireless devices which support it, or by not using the invention and/or associated signalling towards wireless devices which do not support it. Another possible means of informing the network node that an accessing wireless device supports (or does not support) the feature is through an indication in RA Msg3. If the indication indicates that the wireless device supports the feature, the network node (or MME) may safely store and/or use the S-TMSI<->C-RNTI mapping, but if the indication is absent or indicates lack of support, the network node (or MME) should neither store nor use the S-TMSI<->C-RNTI mapping.

In the rare cases when the wireless device moves to another (non-overlapping) MME pool and the S-TMSI consequently cannot be assumed to be unique anymore, special measures are needed to deal with the situation.

In the case where the mapping table is stored in the MME there are a number of means that could be applied to mitigate the (already small) problem. In this situation there is a risk, as indicated above, that the MME finds an erroneous match in its database, i.e. the same S-TMSI has by chance been allocated to another wireless device by the new MME that the concerned wireless device has moved to. The network node will then try to reach the wireless device using an erroneous C-RNTI. If the wireless device that actually "owns" the C-RNTI is still connected in the cell, this wireless device will receive the RRCConnectionSetup message which it has not asked for. These problems may be alleviated through a couple of means.

To at least avoid that another wireless device than intended receives the RRCConnectionSetup message, the MME could keep track of whether or not an S1 connection exists for the S-TMSI the interrogation from the network node concerns, and this would be needed anyway because the timer for the database entry should be started when the S1 connection is released. If there is an S1 connection, the MME will conclude that it is an erroneous database hit and will inform the network node without returning any C-RNTI.

Alternatively, or in addition, the network node could check every C-RNTI it receives from the MME with its own list of already allocated (and active) C-RNTIs and if the C-RNTI is found in the list, the network node can conclude that the C-RNTI returned from the MME is erroneous and thus refrain from using it. The network node may keep track of only the currently active C-RNTIs and check the C-RNTI received from the MME against this list or it may keep track of both currently active C-RNTIs and old C-RNTIs which are yet assumed to be stored in the MME and remembered by a wireless device that was previously (but not currently) connected in the cell. In the latter case the network node would use the C-RNTI received from the MME only if it is present in the list of old (non-active but still assumed "allocated") C-RNTIs (and absent in the list of currently active C-RNTIs). Note that the network node anyway has to remember all these C-RNTIs (and time them out successively in the case of the non-active C-RNTIs), in order not to mistakenly allocate them to new wireless devices.

Another way to eliminate the risk that the wrong wireless device receives the RRCConnectionSetup message would be to ensure that the MME does not get an erroneous hit in the mapping table for wireless devices that have active S1 connections, i.e. that are in RRC_CONNECTED state. To achieve this the network node does not transfer a newly allocated C-RNTI to the MME until in the wireless device CONTEXT RELEASE COMPLETE S1AP message (instead of in the INITIAL UE MESSAGE S1AP message or the INITIAL CONTEXT SETUP RESPONSE S1AP message or the UPLINK NAS TRANSPORT S1AP message) or that the MME does not store the C-RNTI in the mapping table until the S1 connection for the concerned wireless device is released (even if the MME received the C-RNTI from the network node already when the S1 connection was established, e.g. in the INITIAL UE MESSAGE S1AP message). In addition, the MME would have to remove the S-TMSI-C-RNTI entry from the mapping table when an S1 connection is established for that S-TMSI. However, then another solution has to be used to inform the MME at X2 handovers. The source network node could transfer the C-RNTI in the Handover Request X2AP message to the target network node which would forward it to the MME in the PATH SWITCH REQUEST S1AP message. Regarding the network node internal handovers, the INITIAL UE MESSAGE S1AP message (or the INITIAL CONTEXT SETUP RESPONSE S1AP message or the UPLINK NAS TRANSPORT S1AP message) may be used for conveying the allocated C-RNTI.

Yet another way would be that the MME does not store the C-RNTI in the mapping table until the S1 connection for the concerned wireless device is released in the concerned network node, e.g. triggered by the UE CONTEXT RELEASE COMPLETE S1AP message or the PATCH SWITCH REQUEST S1AP message.

Another potentially possible way to deal with this problem is that the network node looks at the establishmentCause IE in the RRCConnectionRequest and if it is set to 'mo- Signaling' (="mobile originated signaling"), the network node assumes that no old C-RNTI will be available and will not interrogate the MME. This method is based on the assumption that this establishmentCause will be used when the wireless device intends to perform a Tracking Area Update (in which case the chances are smaller that the wireless device has recently been connected in this cell).

In the case where the mapping table is stored in the network node, all the network node can do is to rely on the establishmentCause, as described above, and/or to make sure that the received S-TMSI does not match that of a wireless device that is presently connected.

The mapping table used in this invention not only has to be created and used for mappings, it also has to be maintained. One obvious measure that the network node has to take is to ensure that it avoids allocating C-RNTIs in the table to other wireless devices.

Another maintenance task that has to be handled (by the network node or the MME depending on where the mapping table is stored) is timing out of table entries. An S-TMSI-C-RNTI entry that is not used should not be stored indefinitely in the mapping table. It should be timed out and removed. The timer should be restarted each time the concerned wireless device stops actively using the C-RNTI, i.e. when the wireless device goes to RRC_IDLE state or leaves the cell where the C-RNTI was allocated. If the wireless device returns to the cell and reuses the C-RNTI before the timer has expired, the timer is stopped, then restarted the next time the wireless device stops actively using the C-RNTI.

An old C-RNTI should not only be timed out of the mapping table in the network, but also in the wireless device. This creates a risk for mismatches between the network and the wireless device due to imperfect timer synchronisation, so that one considers the old C-RNTI to still be dedicated to the wireless device, while the other one considers it not to be. Therefore, different timers should be used in order to provide some guard times that prevents disadvantageous consequences of such imperfect timer synchronisation. FIG. 6c illustrates how different timers may be used for this purpose.

The following refers to the second timeline in FIG. 6c:

t0: The C-RNTI is initially allocated to the wireless device in the cell.

t1: The wireless device stops using the C-RNTI, because it ceases to be in RRC_CONNECTED state in the cell. This may be e.g. because it is switched to RRC_IDLE state or because it has been handed over to another cell or because it lost coverage. This triggers the timers in the wireless device and in the network (the network node or the MME, depending on where the mapping table is stored) to be started for the storage of this C-RNTI and its allocation to the wireless device.

t2: The wireless device returns to RRC_CONNECTED state in the cell, either triggered by an RRCConnectionRequest from the wireless device or because the wireless device is handed over from another cell. The network node reassigns the same C-RNTI to the wireless device, which starts using it. This triggers the timers in the wireless device and in the network (the network node or the MME, depending on where the mapping table is stored) to be stopped.

t3: The wireless device stops using the C-RNTI (again), because it ceases to be in RRC_CONNECTED state in the cell. This may be e.g. because it is switched to RRC_IDLE state or because it has been handed over to another cell or because it lost coverage. This triggers the timers in the wireless device and in the network (the network node or the MME, depending on where the mapping table is stored) to be restarted for the storage of this C-RNTI and its allocation to the wireless device.

t4: A first timer expires in the network (the network node or the MME, depending on where the mapping table is stored) and the network stops using the C-RNTI for the wireless device, but keeps the C-RNTI blocked from allocation to other wireless devices.

t5: The timer expires in the wireless device and the wireless device (internally) deletes the C-RNTI.

t6: A second timer expires in the network (the network node or the MME, depending on where the mapping table is stored) and the network frees the C-RNTI for allocation to other wireless devices.

Although cases should be rare, upon re-assignment/re-use of S-TMSIs, there may be old mappings which pertain to a different wireless device. To ensure that the wireless device to which the S-TMSI has been assigned can access the network, the network may:

Re-use only S-TMSIs which are known not to have active mappings.
  Re-use S-TMSIs conservatively, e.g. such that they are not reused before associated mapping validity timers have expired.
  Remove old S-TMSI mappings upon re-assignment/re-use of S-TMSI, e.g. based on indication to nodes(s) which have active mappings of an S-TMSI when it is re-assigned/re-used.
  Remove a mapping and use legacy procedure when a wireless device is not responding to the old C-RNTI; e.g. after one or more access attempts.
  Ignore a mapping and use legacy procedure when a wireless device is not responding to the old C-RNTI; e.g. after one or access attempts.

Embodiments herein also relate to a method performed by a network node for use in a Random Access, RA, procedure with wireless device(s) in a cell of the network node, which will be described with reference to FIGS. 7a and 7b.

Figure 7A:
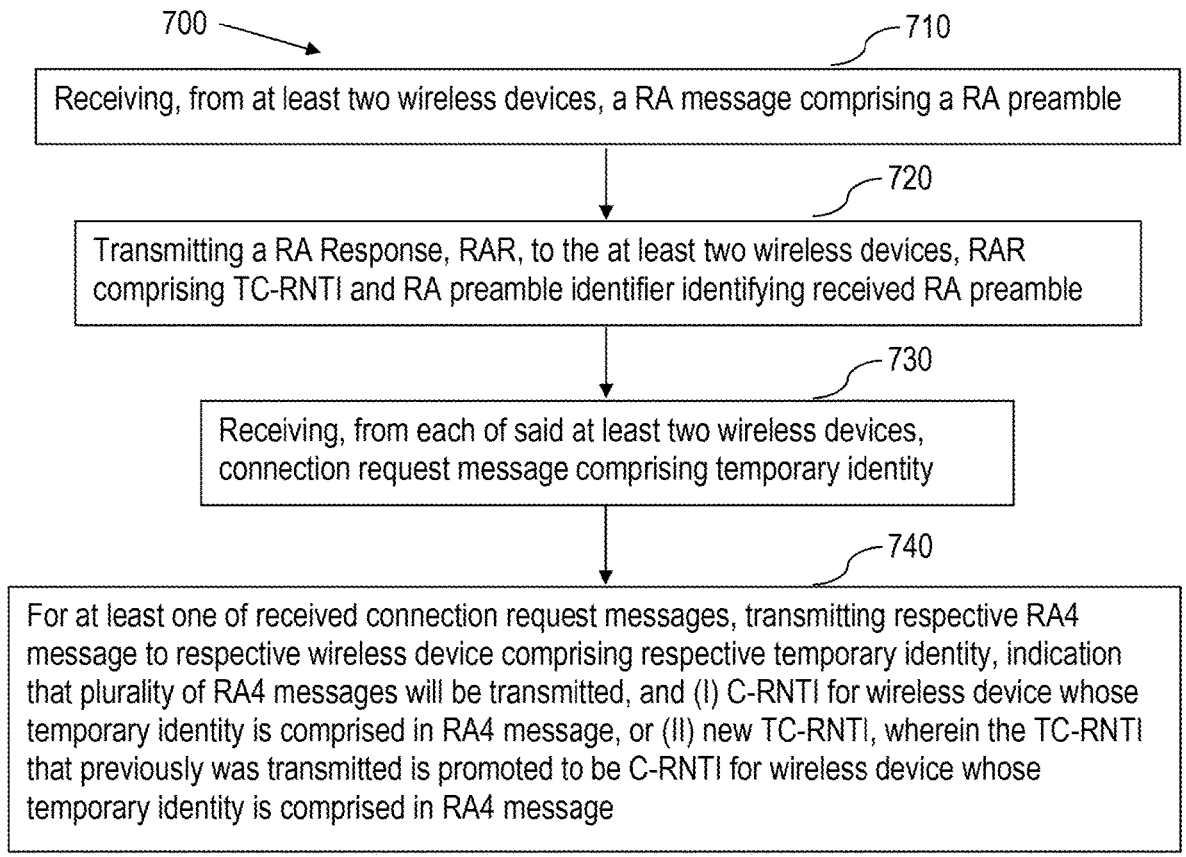
FIG. 7a is a flowchart of a method performed by a network node for use in a RA procedure with wireless devices in a cell of the network node according to an exemplifying embodiment.

FIG. 7a illustrates the method comprising receiving 710, from at least two wireless devices, an RA message comprising an RA preamble; transmitting 720 a RAR to the at least two wireless devices, the RAR comprising a TC-RNTI and an RA preamble identifier identifying the received RA preamble; and receiving 730, from each of said at least two wireless devices, a connection request message in a RA3 message comprising a respective temporary identity. The method further comprises, for at least one of the received connection request messages, transmitting 740 a respective RA4 message to a respective wireless device comprising the respective temporary identity for the wireless device that sent the connection request message, an indication that a plurality of RA4 messages, or connection setup messages, will be transmitted, and (I) a C-RNTI for the wireless device whose temporary identity is comprised in the RA4 message, or (II) a new TC-RNTI, wherein the TC-RNTI that previously was transmitted is promoted to be a C-RNTI for the wireless device whose temporary identity is comprised in the RA4 message.

The first three steps of the method 710, 720 and 730 corresponds to the steps 510, 520 and 530 of FIG. 5a as described above.

Thus, the network node receives 730 each of the connection request messages comprising the respective S-TMSI of the wireless devices that sent the messages. The network node may at this point understand that there is a collision since several connection request messages are received.

The network node may then handle the at least two different temporary identities that are received in the at least two received connection request messages in the following manner. The network node may only address one wireless device, or one received request at a time. Thus, in order to both address one wireless device and still let the other wireless device(s) know that their RA has not yet failed, the network device may transmit a RA4 message to a wireless device comprising the respective temporary identity for the wireless device that sent the connection request message, the indication that a plurality of connection setup messages will be transmitted, and (I) the C-RNTI for the wireless device whose temporary identity is comprised in the RA4 message. The message is addressed to the TC-RNTI and may be received by all wireless devices, wherein the wireless device whose temporary identity is comprised in the message will know that the message is intended for it and that the C-RNTI is allocated for it. The other wireless device(s) that receive(s) the message will be informed that there will be at least one more RA4 message coming up so that their RA attempt has not yet failed. The message could optionally comprise a request for the wireless device whose temporary identity is comprised in the message to use the C-RNTI as the C-RNTI.

Alternatively, the RA4 message comprises the respective temporary identity for the wireless device that sent the connection request message, the indication that a plurality of connection setup messages will be transmitted, and (II) a new TC-RNTI, wherein the TC-RNTI that previously was transmitted is promoted to be a C-RNTI for the wireless device whose temporary identity is comprised in the RA4 message. As above, the RA4 message is addressed to the TC-RNTI and may be received by all wireless devices that expect such a message. The wireless device whose temporary identity is comprised in the RA4 message will understand that the message is responding to its connection request (in the RA3 message) and the RA4 message will inform the wireless device that the TC-RNTI that previously was transmitted is promoted to be a C-RNTI for this wireless device. The other wireless device(s) that receive the message will understand that at least one additional RA4 message is to be expected and the new TC-RNTI that is included in this RA4 message is to replace the TC-RNTI that previously was transmitted. The new TC-RNTI in the RA4 message may serve as the indication that at least one additional RA4 message is to be transmitted from the network node. Any wireless device that receives the RA4 message and whose temporary identity is not comprised in the RA4 message may thus discard any previous received TC-RNTI.

For example, assume three wireless devices, A, B and C have sent an RA request, i.e. an RA1 message comprising a random access preamble. In the RAR, action 720 of FIG. 7*a*, a first TC-RNTI is transmitted. In the first RA4 message, which is addressed to the first TC-RNTI and comprising a new TC-RNTI, assume that the temporary identity of wireless device A is included. Then wireless device A is informed that the first TC-RNTI is promoted to be the C-RNTI for wireless device A, wherein wireless devices B and C are informed that subsequent RA4 message(s) will be sent. Wireless devices B and C further discard the first TC-RNTI and remember the new TC-RNTI that is comprised in the first RA4 message, the new TC-RNTI being a second TC-RNTI. Then wireless devices B and C receive a second RA4 message addressed to the second TC-RNTI and comprising a new TC-RNTI (i.e. a third TC-RNTI) and the temporary identity of wireless device B. By the second RA4 message, wireless device B is informed that it shall promote the second TC-RNTI to be the C-RNTI for wireless device B, wherein wireless device C is informed that yet a subsequent RA4 message is to follow. Wireless device then discards the second TC-RNTI and remembers the third TC-RNTI. Then a third RA4 message is transmitted, addressed to the third TC-RNTI and received by wireless device C comprising the temporary identity of wireless device C, wherein wireless device C promotes the third TC-RNTI to be the C-RNTI for wireless device C.

In both alternatives (I) and (II), possibly all wireless devices that transmitted the same initial RA request (i.e. the same preamble in the same random access resource (e.g. PRACH resource) may be successfully connected to the network node.

The method performed by the network node may have several advantages. By using the identities of the wireless devices, e.g. S-TMSI, the network node may differentiate wireless devices colliding on the same preamble and allocating C-RNTIs other than the TC-RNTI allows the network node to successively respond to multiple preamble colliding wireless devices. As a result, fewer failed RA access attempts and reduced radio access latency may be achieved. By increasing the contention resolution efficiency, the PRACH capacity is better utilised and this allows the handling of high RA intensities. This facilitates traffic prioritisation/handling by the network which is crucial in high load and emergency scenarios with many wireless devices trying to acquire transmission resources. In addition, the load on the PUSCH, PDSCH, and PDCCH may be reduced. The freed up PRACH, PDCCH, PDSCH and/or PUSCH resources may be used for other data/signalling instead. In this manner, the RAN achieves an overall better resource efficiency and better performance for the wireless devices.

Figure 7B:
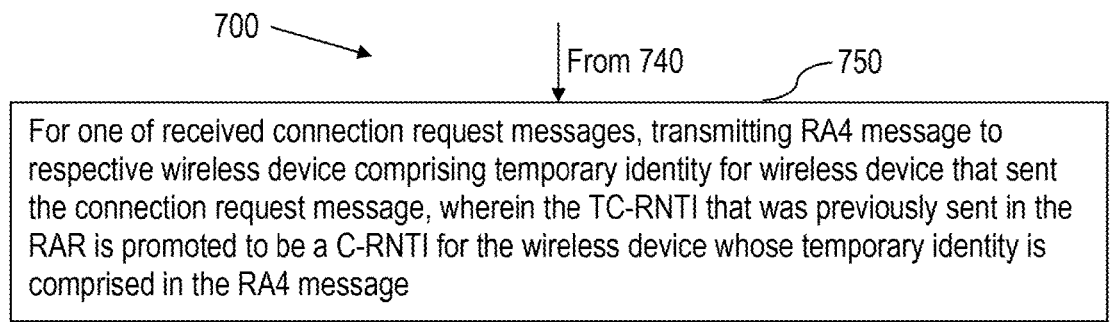
FIG. 7b is a flowchart of a method performed by a network node for use in a RA procedure with wireless devices in a cell of the network node according to still an exemplifying embodiment.

The method may further comprise as illustrated in FIG. 7*b*, for one of the received connection request message, transmitting 750 a RA4 message comprising the temporary identity for the wireless device that sent the connection request message, wherein the TC-RNTI that was previously sent in the RAR is promoted to be a C-RNTI for the wireless device whose temporary identity is comprised in the RA4 message.

As described above, the method comprises: for at least one of the received connection request messages, transmitting 740 a respective RA4 message to a respective wireless device comprising the respective temporary identity for the wireless device that sent the connection request message, an indication that a plurality of connection setup messages will be transmitted, and (I) a C-RNTI for the wireless device whose temporary identity is comprised in the RA4 message.

Thus, if the above said "at least one" does not include all wireless devices, then for one wireless device excluded from the "at least one", the network node transmits the RA4 message comprising the temporary identity for the wireless device that sent the connection request message, wherein the TC-RNTI that was previously sent in the RAR is promoted to be a C-RNTI for the wireless device whose temporary identity is comprised in the RA4 message.

Consequently, for all but one wireless device, the RA4 message may comprise a respective C-RNTI that is different from the TC-RNTI that was previously transmitted in the RAR (action 720), wherein the TC-RNTI that was previously transmitted in the RAR is promoted to be a C-RNTI for the one wireless device (the last one to receive an RA4 message).

In an example, the indication that a plurality of connection setup messages will be transmitted comprises a flag.

The flag may have different functions as will be described in more detail below. The flag may however convey information to the wireless devices pertaining to the ongoing RA procedure.

In yet an example, the indication that a plurality of connection setup messages will be transmitted comprises the C-RNTI.

The C-RNTI may itself serve as the indication that the plurality of connection setup messages, or RA4 message, will be transmitted from the network node, i.e. that at least one additional RA4 message will be transmitted.

In still another example, the flag comprises an indication of a period of time that the wireless device(s) shall listen for a subsequent RA4 message.

The flag may convey different information pertaining to the ongoing RA procedure to the wireless devices. In this example, the wireless devices are informed that they should not conclude the RA request to have failed until after the period of time has lapsed and if the wireless device then has not yet received an RA4 message comprising its temporary identity.

Thus, the wireless devices receiving the RA4 message comprising the flag indicating the period of time that the wireless device(s) shall listen for a subsequent RA4 message may start a timer and listen for subsequent RA4 messages.

In another example, the flag comprises a number indicating a number of following RA4 messages.

The wireless devices are in this manner informed, when receiving the RA4 message not comprising their respective temporary identity, that in addition to the received RA4 message, a further number of RA4 message is to be sent.

The wireless devices may then count each received RA4 message and if any wireless device has received the same number of RA4 message as indicated by the flag without one of the received RA4 messages comprising its temporary identity, that wireless device may conclude that its RA request, or attempt, has failed.

In yet another example, the flag comprises a list of the temporary identities of the remaining wireless device(s) which the network node will respond to with subsequent RA4 message(s).

All wireless devices receiving the RA4 message are then informed that a plurality of wireless devices have sent a RA request with the same RA preamble using the same RA resource.

Note that multiple temporary identities will, according to this example, be included in the RA4 message. One of these included temporary identities will serve the purpose of indicating with wireless device that the RA4 message is intended for (i.e. this is the temporary identity that was included in the RA3 message that this RA4 message is responding to). The other included temporary identity/identities constitute the above mentioned list of wireless device(s) which the network node intends to respond to with subsequent RA4 message(s). Hence, in case one or more wireless devices receive(s) an RA4 message that does not comprise the temporary identity of the wireless device(s) in the role of indicating the intended recipient of the RA4 message, each such wireless device may read the list and conclude if it is on the list that an RA4 message responding to its RA3 message will most likely be received soon.

However, if a wireless device has sent an RA request, receives the RA4 message comprising the list of the temporary identities of the remaining wireless device(s) which the network node will respond to with subsequent RA4 message(s), wherein the temporary identity of the wireless device is neither in the list nor included as the indication of the intended recipient of the RA4 message, such a wireless device may conclude that its RA request, or RA attempt, has failed.

The method may further comprise when transmitting a RA4 message to a respective wireless device, including an indication that no further RA4 messages will be sent.

When the network node is to transmit the last RA4 message according to the received connection requests, the network node may include the indication that no further RA4 messages will be sent.

It may be that other wireless devices have transmitted the same RA request with the same RA preamble, but that the network node has not successfully received them. By including the indication that no further RA4 messages will be sent, the network node may inform such wireless devices listening for, and expecting, an RA4 message addressing their RA request that their request, or attempt, has failed. Note that such an indication may be implicit, e.g., it may be concluded from the absence of the flag indicating additional RA4 messages to come.

Figure 8A:
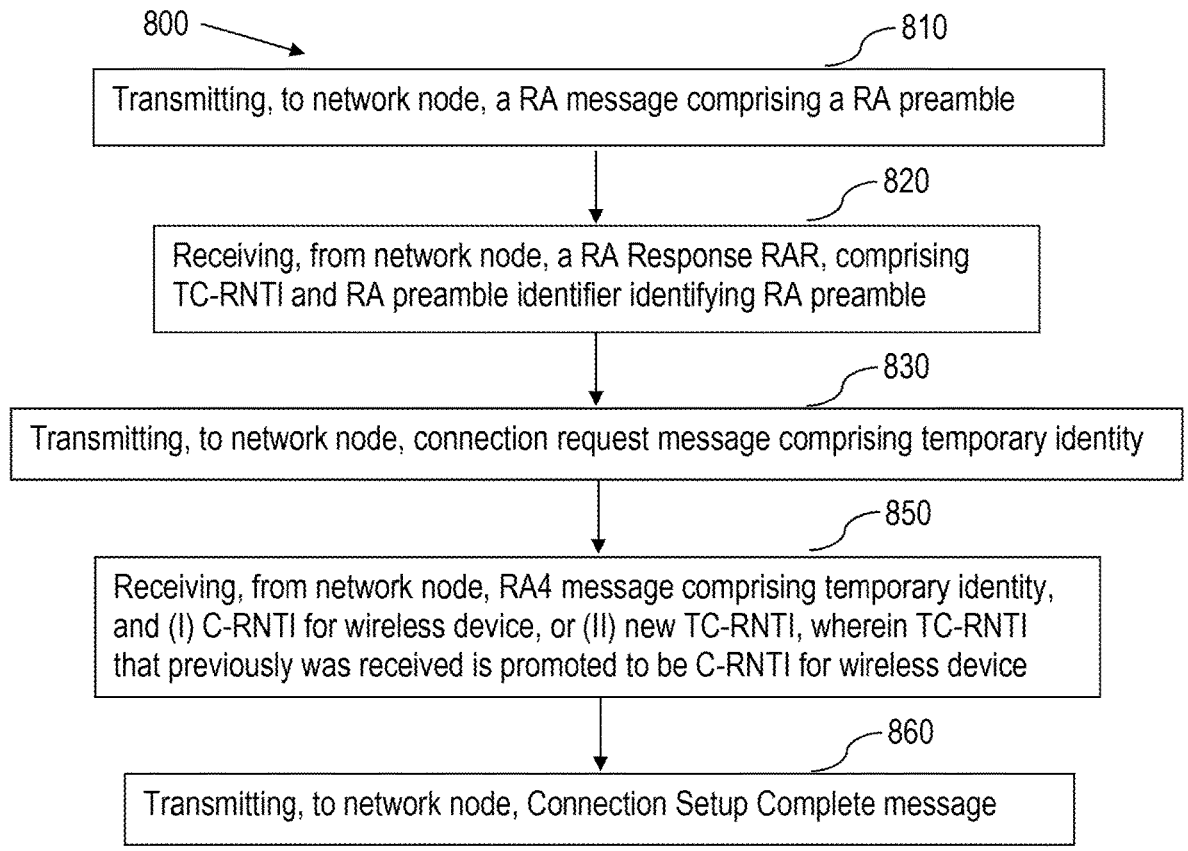
FIG. 8a is a flowchart of a method performed by a wireless device for use in an RA procedure with a network node in a cell of the network node according to an exemplifying embodiment.

Embodiments herein also relate to method 800 performed by a wireless device for use in an RA procedure with a network node in a cell of the network node. Embodiments of such a method will now be described with reference to FIGS. 8*a*-8*f*. FIG. 8*a* illustrates the method comprising transmitting 810, to the network node, a RA message comprising an RA preamble; receiving 820 from the network node, a RAR comprising, a TC-RNTI, and an RA preamble identifier identifying the RA preamble; and transmitting 830, to the network node, a connection request message in a RA3 message comprising a temporary identity. The method further comprises receiving 850, from the network node, a RA4 message comprising the temporary identity, an indication that a plurality of connection setup messages will be transmitted, and (I) a C-RNTI for the wireless device, or (II) a new TC-RNTI, wherein the TC-RNTI that previously was received is promoted to be a C-RNTI for the wireless device; and transmitting 860, to the network node, a Connection Setup Complete message.

The first three actions 810, 820 and 830 of FIG. 8*a* corresponds to the actions 610, 620 and 630 of FIG. 6*a*. As described above, the wireless devices that all have sent the same RA request comprising the same RA preamble are unaware of the RA preamble collision situation that has occurred.

Thus, all the wireless devices receive the RA4 message comprising the temporary identity of one of the wireless devices, the indication that a plurality of RA4 messages (connection setup messages) will be transmitted, and (I) the C-RNTI for one of the wireless devices, or (II) the new TC-RNTI, wherein the TC-RNTI that previously was received is promoted to be the C-RNTI for one of the wireless devices.

For the wireless device whose temporary identity is comprised in the RA4 message, the wireless device will either (I) remember, or use, the C-RNTI comprised in the message, or (II) promote the previously received TC-RNTI to be the C-RNTI for itself, i.e. for the wireless device whose temporary identity is comprised in the RA4 message.

For the wireless devices whose temporary identity is not comprised in the RA4 message, the wireless devices either (I) are informed that a plurality of connection setup, or RA4, messages will be transmitted and listen for a subsequent RA4 message, or (II) discard the previously received TC-RNTI and remember the new TC-RNTI that was received in the message and then listen for a subsequent RA4 message.

For the wireless device whose temporary identity is comprised in the RA4 message, the wireless device may then transmit a connection setup complete message, e.g. a RRCConnectionSetupComplete message, to the network node to indicate that its RA request or RA attempt was successfully completed.

The method performed by the wireless device has the same possible advantages as the method performed by the network node. By using the temporary identities of the wireless devices, e.g. S-TMSI, the network node may differentiate wireless devices colliding on the same preamble and allocating C-RNTIs other than the TC-RNTI allows the network node to successively respond to multiple preamble colliding wireless devices. As a result, fewer failed RA access attempts and reduced radio access latency may be achieved. By increasing the contention resolution efficiency, the PRACH capacity is better utilised and this allows the handling of high RA intensities. This facilitates traffic prioritisation/handling by the network which is crucial in high load and emergency scenarios with many wireless devices trying to acquire transmission resources. In addition, the load on the PUSCH, PDSCH, and PDCCH may be reduced. The freed up PRACH, PDCCH, PDSCH and/or PUSCH resources may be used for other data/signalling instead. In this manner, the RAN achieves an overall better resource efficiency and better performance for the wireless devices.

Figure 8B:
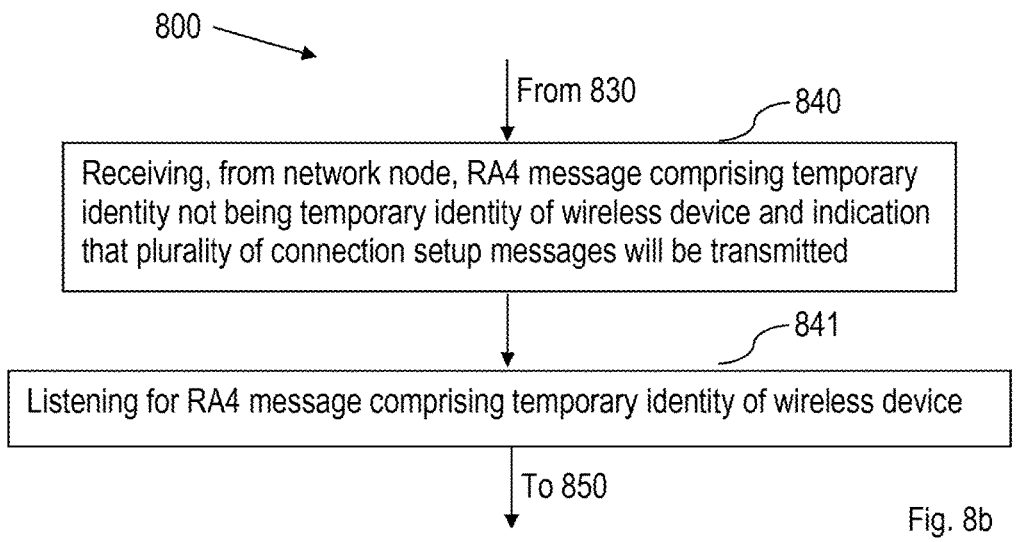
FIG. 8b is a flowchart of a method performed by a wireless device for use in an RA procedure with a network node in a cell of the network node according to yet an exemplifying embodiment.

The method may further comprise, as illustrated in FIG. 8b, receiving 840, from the network node, a RA4 message comprising a temporary identity not being the temporary identity of the wireless device, and an indication that at least one additional RA4 message(s) will be transmitted, and in response to receiving the indication that at least one additional RA4 message(s) will be transmitted: listening 841 for a RA4 message comprising the temporary identity of the wireless device.

When any wireless device receives the RA4 message not comprising its temporary identity, the indication that at least one additional RA4 message (connection setup message) will be transmitted informs the wireless device that its RA request, or RA attempt, has not yet failed. Thus the wireless device may continue to listen 841 for a subsequent RA4 message comprising the temporary identity of the wireless device.

In an example, the C-RNTI in the received message serves as the indication that at least one additional RA4 message will be transmitted.

As described above, the C-RNTI itself may serve as the indication that at least one additional RA4 message will be transmitted. Since the wireless device(s) receiving the message cannot find its/their temporary identity, it/they may interpret the C-RNTI as the indication that the at least one additional RA4 message will be transmitted. Alternatively, there may be a separate information element in the message that serves as the indication.

Figure 8C:
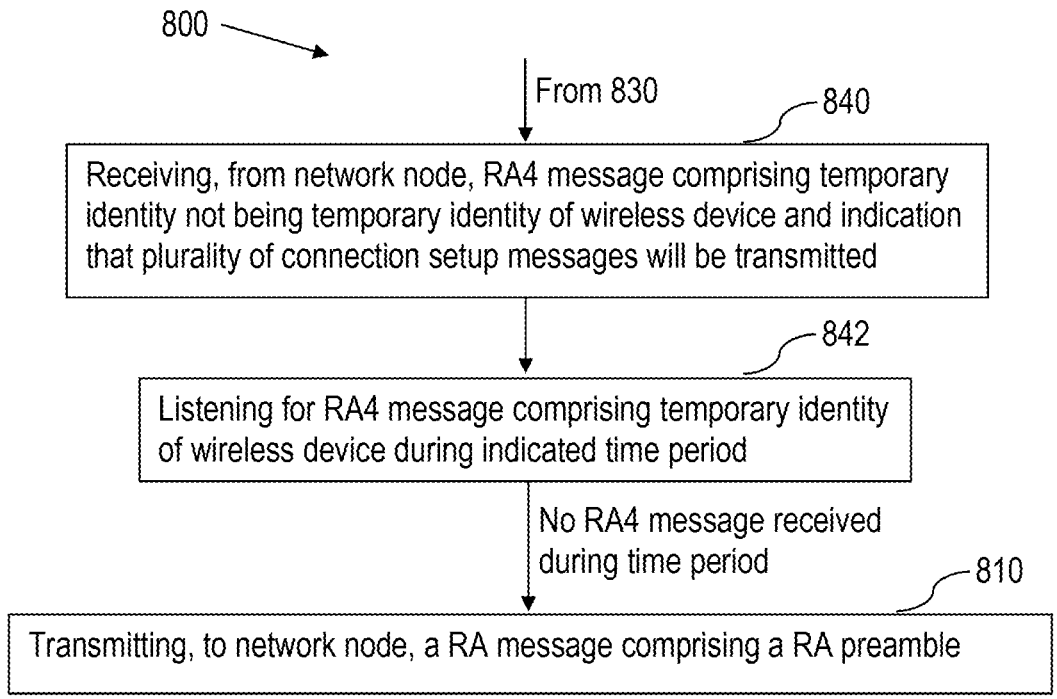
FIG. 8c is a flowchart of a method performed by a wireless device for use in an RA procedure with a network node in a cell of the network node according to still an exemplifying embodiment.

In still another example, illustrated in FIG. 8c, the indication comprises a timer indicating a period of time that the wireless device(s) shall listen for a subsequent RA4 message, the method further comprises listening 842 for the RA message during the indicated time period, and when no RA4 message has been received once the indicated time period has expired, transmitting 810, to the network node, a subsequent RA message comprising an RA preamble.

The indication may be in the form of a flag as described above, wherein the wireless device is informed about the time period that it should allow to lapse before concluding that the RA request, or RA attempt, has failed, granted that the wireless device has not received an RA4 message comprising its temporary identity.

The wireless device may start a timer having the same duration as the indicated time period, wherein the wireless device may listen for an RA4 message comprising its temporary identity as long as the timer has not yet lapsed. If the timer lapses and the wireless device still has not received an RA4 message comprising its temporary identity, the wireless device may conclude that the RA request, or RA attempt, has failed.

The wireless device may transmit a new RA request, making a new attempt to connect to the network node. Optionally, the wireless device may wait during a back-off period before transmitting the new RA request.

Figure 8D:
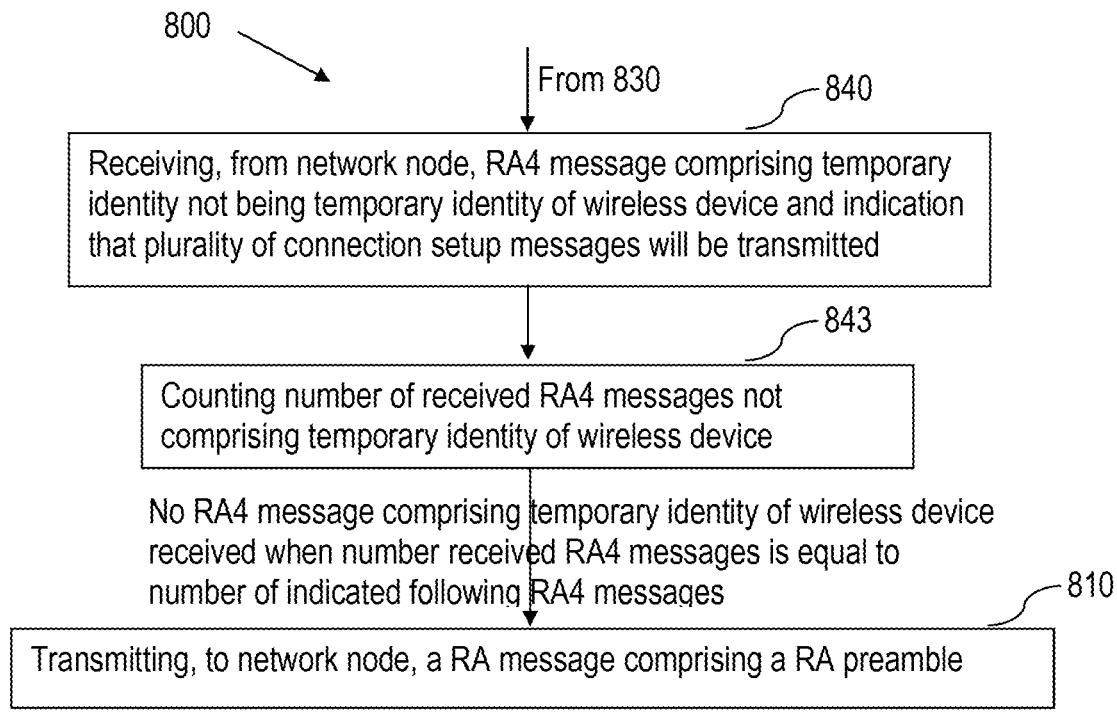
FIG. 8d is a flowchart of a method performed by a wireless device for use in an RA procedure with a network node in a cell of the network node according to another exemplifying embodiment.

In yet another example, illustrated in FIG. 8d, the indication comprises a number indicating a number of following RA4 messages, the method further comprising counting 843 the number of received RA4 messages not comprising the temporary identity of the wireless device, and when the number of received RA4 messages are equal to the number indicating a number of following RA4 messages, transmitting 810, to the network node, a subsequent RA message comprising an RA preamble.

In order to know when to conclude that the RA request, or RA attempt, has failed, the RA4 message may comprise the number of following RA4 messages. This number may constitute the above described flag indicating that at least one additional RA4 message will follow. In this manner, the wireless device is enabled to keep track of how many RA4 messages that are received from the network node.

The wireless device may count each received RA4 message, and if the number of received RA4 messages corresponds to the number in the RA4 message indicating the number of following RA4 messages, wherein the wireless device has still not received an RA4 message comprising its temporary identity, the wireless device may conclude that the RA request, or RA attempt, has failed.

More precisely, as one option, each transmitted RA4 message may comprise a number indicating the number of RA4 message(s) yet to follow. This number will be decreased by one for each transmitted message and in the last RA4 message the number will be set to zero or, optionally, be absent. As another option, the number indicating the number of RA4 message(s) to follow is only included in the first RA4 message. A wireless device receiving this RA4 message then knows how many subsequent RA4 message(s) to listen for before concluding that the RA request, or RA attempt, has failed (provided that none of the RA4 messages included the temporary identity of the wireless device). By omitting the number indication in all but the first RA4 message, this option reduces the amount of data somewhat in all but the first RA4 message, which may be advantageous.

After concluding that the RA request, or RA attempt, has failed, the wireless device may transmit a new RA request, making a new attempt to connect to the network node. Optionally, the wireless device may wait during a back-off period before transmitting the new RA request.

Figure 8E:
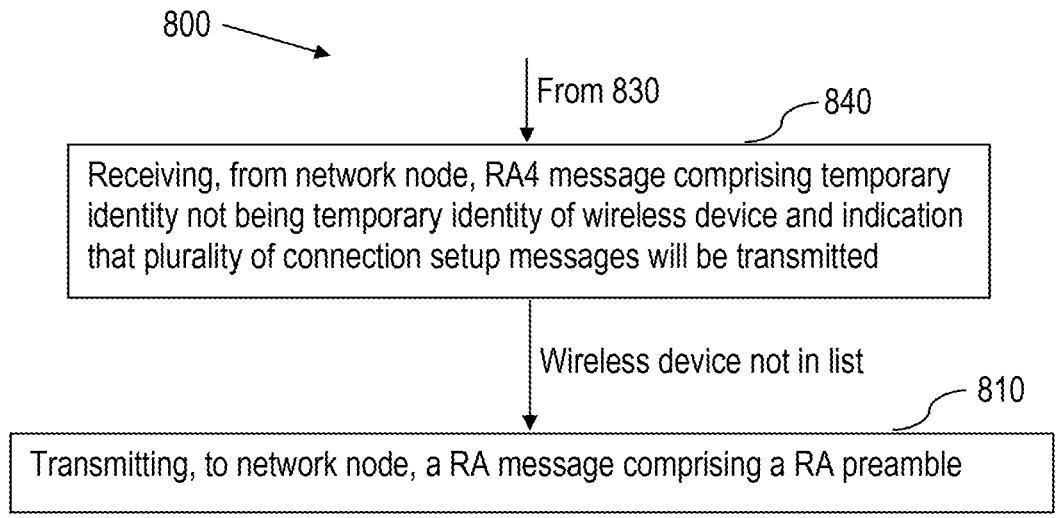
FIG. 8e is a flowchart of a method performed by a wireless device for use in an RA procedure with a network node in a cell of the network node according to a further exemplifying embodiment.

In another example, illustrated in FIG. 8e, the indication comprises a list of the temporary identity/identities of the remaining wireless device(s) which the network node will respond to with subsequent RA4 message(s), the method comprising when the wireless device is not in the list, transmitting 810, to the network node, a subsequent RA message comprising an RA preamble.

Just as explained above, the RA4 message may comprise the list of the temporary identities of the remaining wireless device(s) which the network node will respond to with subsequent RA4 message(s). In this manner, all wireless devices that receive the RA4 message may see if they are on the list and if not, they may conclude that the RA request, or RA attempt, has failed. Similar to the case with the above described number indication, as one option each transmitted RA4 message may include a list of the temporary identity/identities of the remaining wireless device(s) to respond to and this list will consequently be pruned by one temporary identity for each transmitted RA4 message. And, again similar to the case with the above described number indication, in accordance with another option only the first RA4 message includes the list of temporary identity/identities of the remaining wireless device(s) to respond to. This is enough for a receiving wireless device, whose temporary identity is not included in the RA4 message as indication of the intended recipient, to know whether to keep listening for additional RA4 message(s). That is, if the temporary identity of the wireless device is included in the list, the wireless device keeps listening for subsequent RA4 message(s), but if the temporary identity is not included in the list, the wireless device concludes that the RA request, or RA attempt, has failed.

If and when the wireless device concludes that the RA request, or RA attempt, has failed, the wireless device may transmit a new RA request, making a new attempt to connect to the network node. Optionally, the wireless device may wait during a back-off period before transmitting the new RA request.

Figure 8F:
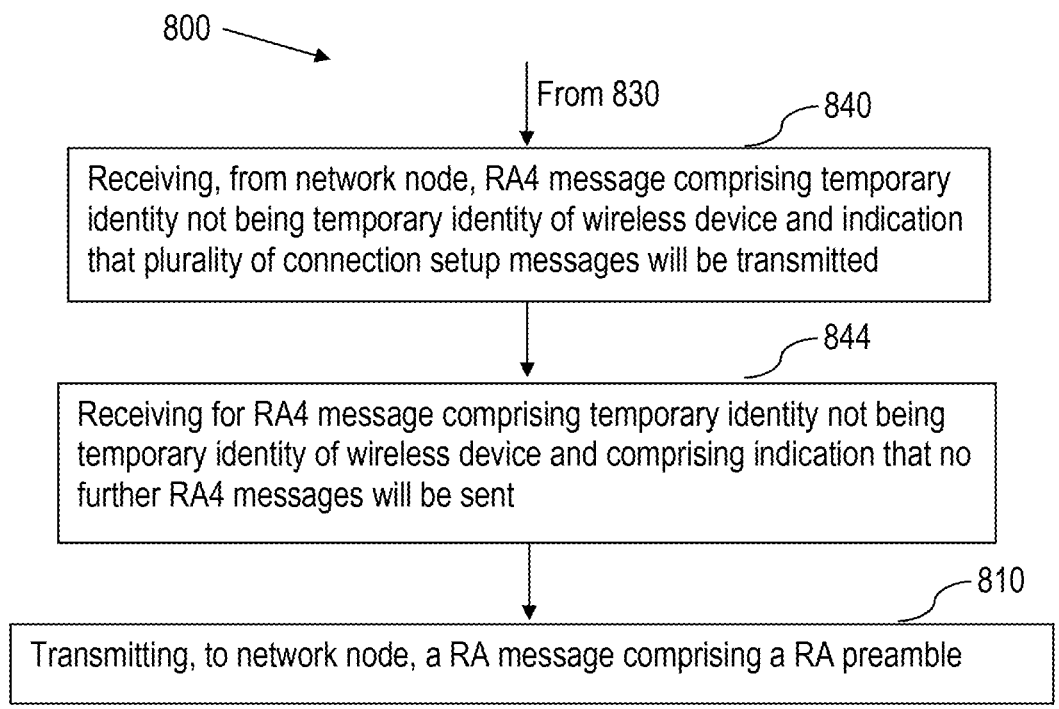
FIG. 8f is a flowchart of a method performed by a wireless device for use in an RA procedure with a network node in a cell of the network node according to yet an exemplifying embodiment.

The method may further comprise, as illustrated in FIG. 8f, receiving 844, from the network node, a RA4 message comprising a temporary identity not being the temporary identity of the wireless device, and an indication that no further RA4 messages will be sent, the method comprises transmitting 810, to the network node, a subsequent RA message comprising an RA preamble.

In case a wireless device has been listening for an RA4 message comprising its temporary identity and receives the RA4 message comprising the indication that no further RA4 messages will be sent, the wireless device may conclude that the RA request, or RA attempt, has failed.

The indication that no further RA4 messages will be sent may have several different forms, depending on the chosen option. It may be an explicit indication, e.g. a binary flag that can be set to either "at least one additional RA4 message will follow" or "no more RA4 message will follow". As another example, the absence of an indication of at least one additional RA4 message to be transmitted may serve as the indication that no more RA4 message will follow. The indication may also be in the form of a number indicating the additional RA4 message(s) to follow, wherein this number is set to zero. The indication may also be concluded from a list of temporary identity/identities of the wireless device(s) yet to be responded to, wherein a wireless device whose temporary identity is neither included in the RA4 message as indication of the intended recipient, nor included in the list of temporary identity/identities of the wireless device(s) yet to be responded to, concludes that although additional RA4 message(s) may follow, none of them will be intended for the wireless device, which consequently can conclude that its RA request, or RA attempt, has failed. As yet another example, the indication that no more RA4 message(s) will follow may be implicit in that the last of an announced number of RA4 message(s) to be transmitted is received, wherein the number of RA4 message(s) to be transmitted may have been announced in the first transmitted RA4 message.

After concluding that the RA request, or RA attempt, has failed, the wireless device may transmit a new RA request, making a new attempt to connect to the network node. Optionally, the wireless device may wait during a back-off period before transmitting the new RA request.

In the embodiment and examples described above, the network node has the resources to serve all the requesting wireless devices that were identified by their temporary identity, e.g. their S-TMSI, from received RA Message 3 messages, i.e. the connection request messages. The network node may transmit RA Message 4 using the TC-RNTI used by the wireless devices with the same preamble. This message contains the temporary identity, e.g. the S-TMSI, for one of those wireless devices to be served, optionally also a request for this specific wireless device to change to a new C-RNTI and a flag indicating to the other wireless devices with the same preamble to keep listening for another RA Message 4 which will follow. Optionally, the presence of the C-RNTI to be allocated to the addressed wireless device may also serve as the indication to the other wireless devices that more RA Message 4 message(s) will follow. One or more RA Message 4 will follow to address the listening wireless devices. As for the last listening wireless device, the network node may allocate an alternative C-RNTI (unless the option of using this as the indication of more RA Message 4 message(s) is used), or promote the TC-RNTI to a C-RNTI.

In another example, the flag could, for example, be a timer for all the other wireless devices such that they keep listening for another RA Message 4 addressed to their respective temporary identity (S-TMSI) on the same TC-RNTI. After the timer expires, the wireless devices could reinitiate an RA procedure. In another example, the flag could, for example, be a number indicating how many RA message 4 will follow on the same TC-RNTI but with different S-TMSI, i.e. addressed to the other waiting wireless devices. If the number of following RA Message 4 messages is less than the number of listening wireless devices, the unserved wireless devices will repeat the RA procedure once the flag indicates such information, e.g. no more RA Message 4 will follow. The reason for leaving some preamble colliding wireless devices unserved may be either that the network node did not manage to correctly receive and decode their RA Message 3 messages or that the network node does not have enough resources to serve them.

In another example the network node cannot serve all the wireless devices which were identified by their S-TMSI on the same preamble. As a result, the network node could alter the flag to reflect it. An example is when the network node sets the flag to indicate that no more following RA Message 4 will be transmitted, making the wireless devices aware that they need to repeat the RA procedure. This flag can also indicate a back-off timer for all or a specific wireless device.

The parameters introduced in this disclosure, i.e. a C-RNTI to be allocated to a wireless device, an indication of subsequent RA Message 4 message(s) and an optional listening timer, an optional RA Message 4 counter and/or an optional back-off timer, may be included in the RRCConnectionSetup message or in the MAC PDU (as one or more MAC Control Element(s)) carrying the RRCConnectionSetup message. To convey the C-RNTI to be allocated, the already existing C-RNTI MAC Control Element may be used. All the parameters may be included in the RRCConnectionSetup message, but they may also all be included in the MAC PDU carrying the RRCConnectionSetup message or they may be divided between the RRCConnectionSetup message and MAC Control Elements of the MAC PDU and the RRCConnectionSetup message.

With the solution disclosed herein, legacy wireless devices will not understand the new indication/flag (or any other new parameter) in RA Message 4 and will thus not keep listening for further RA Message 4 message(s) after receiving one that was addressed to one of the other colliding wireless devices. Neither does it expect to be allocated another C-RNTI than the TC-RNTI. Hence, legacy wireless devices will fail the random access procedure with the solution as they would without the solution, unless precautions are introduced. Such a precaution could be a new parameter in RA Message 3, indicating that the wireless device supports the new feature. The network node may then not try to use the solution disclosed herein towards a legacy wireless device, i.e. one from which the RA Message 3 lacks an indication of support. The network node may optionally even choose not to use the solution disclosed herein at all, unless all the colliding wireless devices support the feature. The new parameter in RA Message 3 could preferably be introduced as a non-critical extension, e.g. in the RRCConnectionRequest message, or by using one of the two reserved bits in a MAC PDU subheader in order to allow a legacy network node to ignore it. The new parameter(s) in RA Message 4 may also be introduced as non-critical extension(s), but since the method depends on allocating another C-RNTI than the TC-RNTI and this is not expected by a legacy wireless device, using non-critical extension(s) will not be enough to provide backwards compatibility towards legacy wireless devices.

The same precaution may be used in the solution variant (II) wherein the RA4 message comprises a new TC-RNTI, wherein the TC-RNTI that previously was transmitted is promoted to be a C-RNTI for the wireless device whose temporary identity is comprised in the RA4 message. However, if the new parameter(s) in RA Message 4 is(are) introduced as non-critical extension(s), which allows a legacy wireless device to ignore them, then a legacy wireless device would be able to handle this solution variant even without the feature support indication in RA Message 3, provided that the legacy wireless device is the one addressed with the first RA Message 4. Furthermore, if the method using support indication in RA Message 3 is used in this solution variant too, this enables the network node to consciously choose a legacy wireless device (if there is a legacy wireless device among the colliding wireless devices) to address the first RA Message 4 to.

According to an embodiment, a variant leverages the fact that a C-RNTI is allocated to each wireless device through RA Message 4 and that this eliminates the need for a TC-RNTI to promote to a C-RNTI. Hence, the TC-RNTI allocation in the Random Access Response message is omitted and RA Message 4 is instead addressed to a special, predictable RNTI, e.g. called "R4-RNTI". The R4-RNTI could be standardised or indicated in the System Information. Alternatively there could be a set of such R4-RNTIs, and the one in the set to listen for could be derived from the random access preamble used in RA Message 1. The R4-RNTI would also be used to (together with the physical identity of the cell) derive the scrambling sequence for scrambling of RA Message 3.

A variation of this solution variant could be to use the R4-RNTI, as described above, but still assign a TC-RNTI in the Random Access Response message. The TC-RNTI could be used by legacy UEs, but would be ignored by new wireless devices. Then the network node could choose to always respond to both the R4-RNTI and the TC-RNTI to cover both new and legacy wireless devices. This dual response method would however be wasteful and it may be better to use the feature support indication in RA Message 3, as described above, to allow the network node to know the mix of legacy and new wireless devices among the set of colliding responders. This would allow the network node to selectively address RA Message 4 to either the R4-RNTI or the TC-RNTI, depending on whether the concerned wireless devices support the feature. However, as before, only one legacy wireless device would be possible to serve (i.e. respond to) in this way.

Embodiments herein also relate to a network node for use in a RA procedure with wireless devices in a cell of the network node. The network node has the same technical features, objects and advantages as the methods performed thereby. Hence, the network node will only be described in brief in order to avoid unnecessary repetition.

The network node will be described with reference to FIGS. 9 and 11. The network node 900, 1100 is configured to receive, from at least two wireless devices, a RA message comprising an RA preamble; to transmit an RA Response, RAR, to the at least two wireless devices, the RAR comprising a TC-RNTI and an RA preamble identifier identifying the received RA preamble; and to receive, from each of said at least two wireless devices, a connection request message comprising a respective S-TMSI. The network node 900, 1100 further is configured to: for a wireless device previously connected to the network node in the same cell, transmit a connection setup message addressed to a C-RNTI previously assigned to the wireless device; and for a wireless device not previously connected to the network node in the same cell, to transmit, a connection setup message addressed to the TC-RNTI.

The network node 900, 1100 is alternatively configured to receive, from at least two wireless devices, an RA message comprising an RA preamble; to transmit an RAR to the at least two wireless devices, the RAR comprising a TC-RNTI and an RA preamble identifier identifying the received RA preamble; and to receive, from each of said at least two wireless devices, a connection request message comprising a respective temporary identity. The network node 900, 1100 is further configured to, for at least one of the received connection request messages, transmit a respective RA4 message to a respective wireless device comprising the respective temporary identity for the wireless device that sent the connection request message, an indication that a plurality of RA4 messages will be transmitted, and (I) a C-RNTI for the wireless device whose temporary identity is comprised in the RA4 message, or (II) a new TC-RNTI, wherein the TC-RNTI that previously was transmitted is promoted to be a C-RNTI for the wireless device whose temporary identity is comprised in the RA4 message.

The network node 900, 1100 may be realised or implemented in various different ways. A first exemplifying implementation or realisation is illustrated in FIG. 9. FIG. 9 illustrates the network node 900 comprising a processor 921 and memory 922, the memory comprising instructions, e.g. by means of a computer program 923, which when executed by the processor 921 causes the network node 900 to receive, from at least two wireless devices, a RA message comprising an RA preamble; to transmit an RA Response, RAR, to the at least two wireless devices, the RAR comprising a TC-RNTI and an RA preamble identifier identifying the received RA preamble; and to receive, from each of said at least two wireless devices, a connection request message comprising a respective S-TMSI. The memory 922 further comprises instructions, e.g. by means of a computer program 923, which when executed by the processor 921 causes the network node 900 to for a wireless device previously connected to the network node in the same cell, transmit a connection setup message addressed to a C-RNTI previously assigned to the wireless device; and for a wireless device not previously connected to the network node in the same cell, to transmit, a connection setup message addressed to the TC-RNTI.

Alternatively the memory comprises instructions, e.g. by means of a computer program 923, which when executed by the processor 921 causes the network node 900 to receive, from at least two wireless devices, an RA message comprising an RA preamble; to transmit an RAR to the at least two wireless devices, the RAR comprising a TC-RNTI and an RA preamble identifier identifying the received RA preamble; and to receive, from each of said at least two wireless devices, a connection request message comprising a respective temporary identity. The memory 922 further comprises instructions, e.g. by means of a computer program 923, which when executed by the processor 921 causes the network node 900 to, for at least one of the received connection request messages, transmit a respective RA4 message to a respective wireless device comprising the respective temporary identity for the wireless device that sent the connection request message, an indication that a plurality of RA4 messages will be transmitted, and (I) a C-RNTI for the wireless device whose temporary identity is comprised in the RA4 message, or (II) a new TC-RNTI, wherein the TC-RNTI that previously was transmitted is promoted to be a C-RNTI for the wireless device whose temporary identity is comprised in the RA4 message.

Figure 9:
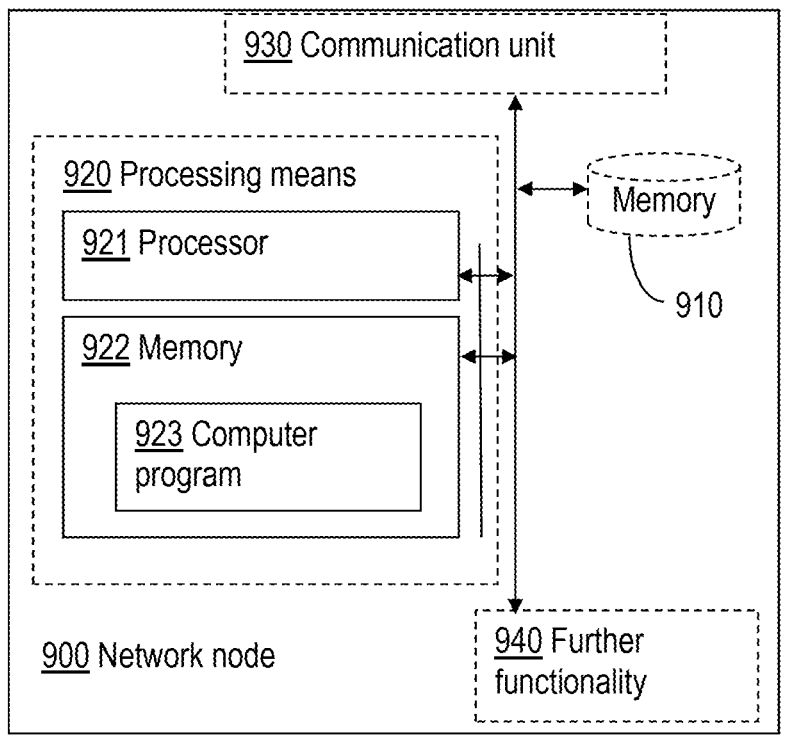
FIG. 9 is a block diagram of a network node for use in an RA procedure with wireless devices in a cell of the network node according to an exemplifying embodiment.

FIG. 9 also illustrates the network node 900 comprising a memory 910. It shall be pointed out that FIG. 9 is merely an exemplifying illustration and memory 910 may be optional, be a part of the memory 922 or be a further memory of the network node 900. The memory may for example comprise information relating to the network node 900, to statistics of operation of the network node 900, just to give a couple of illustrating examples. FIG. 9 further illustrates the network node 900 comprising processing means 920, which comprises the memory 922 and the processor 921. Still further, FIG. 9 illustrates the network node 900 comprising a communication unit 930. The communication unit 930 may comprise an interface through which the network node 900 communicates with other nodes or entities of the communication network as well as wireless device of the communication network. FIG. 9 also illustrates the network node 900 comprising further functionality 940. The further functionality 940 may comprise hardware of software necessary for the network node 900 to perform different tasks that are not disclosed herein. Merely as an illustrative example, the further functionality may comprise a scheduler for scheduling transmissions from the network node 900 and/or for transmissions from wireless devices with which the network node 900 communicates with.

Figure 11:
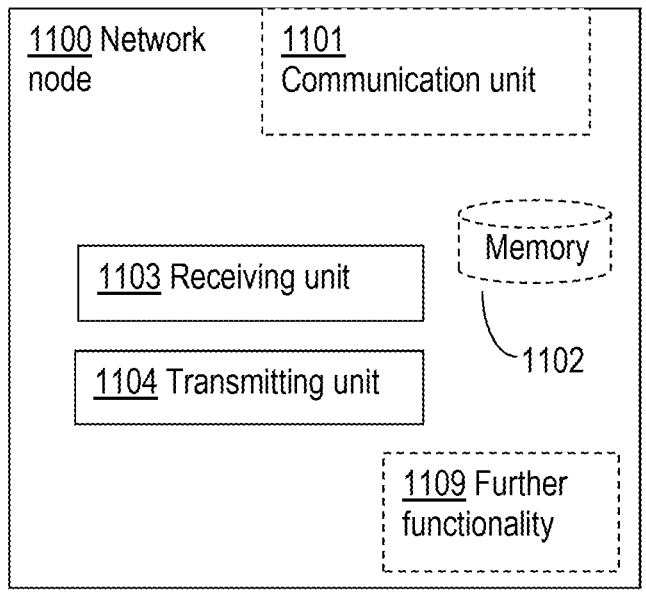
FIG. 11 is a block diagram of a network node for use in an RA procedure with wireless devices in a cell of the network node according to an exemplifying embodiment.

An alternative exemplifying implementation of the network node 900, 1100 is illustrated in FIG. 11. FIG. 11 illustrates the network node 1100 comprising a receiving unit 1103 for receiving, from at least two wireless devices, a RA message comprising an RA preamble. The network node 900 further comprises a transmitting unit 1104 for transmit an RA Response, RAR, to the at least two wireless devices, the RAR comprising a TC-RNTI and an RA preamble identifier identifying the received RA preamble. The receiving unit 1103 is also for receiving, from each of said at least two wireless devices, a connection request message comprising a respective S-TMSI. The transmitting is also for: for a wireless device previously connected to the network node in the same cell, transmitting a connection setup message addressed to a C-RNTI previously assigned to the wireless device; and for a wireless device not previously connected to the network node in the same cell, for transmitting, a connection setup message addressed to the TC-RNTI.

Alternatively, the receiving unit 1103 is for receiving, from at least two wireless devices, a RA message comprising an RA preamble. The network node 900 further comprises a transmitting unit 1104 for transmit an RA Response, RAR, to the at least two wireless devices, the RAR comprising a TC-RNTI and an RA preamble identifier identifying the received RA preamble. The receiving unit 1103 is also for receiving, from each of said at least two wireless devices, a connection request message comprising a respective S-TMSI. The transmitting is also for: for at least one of the received connection request messages, transmitting a respective RA4 message to a respective wireless device comprising the respective temporary identity for the wireless device that sent the connection request message, an indication that a plurality of RA4 messages will be transmitted, and (I) a C-RNTI for the wireless device whose temporary identity is comprised in the RA4 message, or (II) a new TC-RNTI, wherein the TC-RNTI that previously was transmitted is promoted to be a C-RNTI for the wireless device whose temporary identity is comprised in the RA4 message.

In FIG. 11, the network node 1100 is also illustrated comprising a communication unit 1101. Through this unit, the network node 1100 is adapted to communicate with other nodes and/or entities in the wireless communication network. The communication unit 1101 may comprise more than one receiving arrangement. For example, the communication unit 1101 may be connected to both a wire and an antenna, by means of which the network node 1100 is enabled to communicate with other nodes and/or entities in the wireless communication network. Similarly, the communication unit 1101 may comprise more than one transmitting arrangement, which in turn is connected to both a wire and an antenna, by means of which the network node 1100 is enabled to communicate with other nodes and/or entities in the wireless communication network. The network node 1100 further comprises a memory 1102 for storing data. Further, the network node 1100 may comprise a control or processing unit (not shown) which in turn is connected to the different units 1103-1104. It shall be pointed out that this is merely an illustrative example and the network node 1100 may comprise more, less or other units or modules which execute the functions of the network node 1100 in the same manner as the units illustrated in FIG. 11.

It should be noted that FIG. 11 merely illustrates various functional units in the network node 1100 in a logical sense. The functions in practice may be implemented using any suitable software and hardware means/circuits etc. Thus, the embodiments are generally not limited to the shown structures of the network node 1100 and the functional units. Hence, the previously described exemplary embodiments may be realised in many ways. For example, one embodiment includes a computer-readable medium having instructions stored thereon that are executable by the control or processing unit for executing the method steps in the network node 1100. The instructions executable by the computing system and stored on the computer-readable medium perform the method steps of the network node 1100 as set forth in the claims.

The network node has the same advantages as the methods performed thereby. One possible advantage is that fewer failed RA access attempts and a reduced radio access latency may be achieved. Since wireless devices which are known to the network may be differentiated by their S-TMSI, their respective stored C-RNTIs may be used to allocate resources to the these wireless devices, thus avoiding access reattempts during a preamble collision for these wireless devices and this frees up the TC-RNTI which can be used for new wireless devices accessing the network. Further, by increasing the contention resolution efficiency, the PRACH capacity may be better utilised and this allows the handling of high RA intensities. This may facilitate traffic prioritisation/handling by the network which may be crucial in high load and emergency scenarios with many wireless devices trying to acquire transmission resources. In addition, the load on the PUSCH, PDSCH, and PDCCH may be reduced. The freed up PRACH, PDCCH, PDSCH and/or PUSCH resources can be used for other data/signalling instead. In this manner, the RAN achieves an overall better resource efficiency and better performance for the wireless devices. Still further, since the PRACH resources may be more efficiently utilised, operators may be allowed to reduce the amount of radio resources allocated for PRACH. Alternatively, further division of the random access preamble space into subgroups may be facilitated, in order to enable signalling of relevant information already with the preamble (i.e. in RA Message 1), such as data volume pending for uplink transmission, estimated channel quality, wireless device category, etc. By using the identities of the wireless devices, e.g. S-TMSI as the temporary identifier, the network node may differentiate wireless devices colliding on the same preamble and allocating C-RNTIs other than the TC-RNTI allows the network node to successively respond to multiple preamble colliding wireless devices. As a result, fewer failed RA access attempts and reduced radio access latency may be achieved. By increasing the contention resolution efficiency, the PRACH capacity is better utilised and this allows the handling of high RA intensities. This facilitates traffic prioritisation/handling by the network which is crucial in high load and emergency scenarios with many wireless devices trying to acquire transmission resources. In addition, the load on the PUSCH, PDSCH, and PDCCH may be reduced. The freed up PRACH, PDCCH, PDSCH and/or PUSCH resources may be used for other data/signalling instead. In this manner, the RAN achieves an overall better resource efficiency and better performance for the wireless devices.

Embodiments herein also relate to a wireless device for use in a Random Access, RA, procedure with a network node in a cell of the network node. The wireless device has the same technical features, objects and advantages as the methods performed thereby. Hence, the wireless device will only be described in brief in order to avoid unnecessary repetition.

The wireless device will be described with reference to FIGS. 10 and 12. The wireless device 1000, 1200 is configured to transmit, to the network node, a RA message comprising an RA preamble; to receive, from the network node, an RAR, comprising a TC-RNTI, and an RA preamble identifier identifying the RA preamble; and to transmit, to the network node, a connection request message comprising a S-TMSI. The wireless device is further configured to receive, from the network node, a RA message 4 comprising the connection setup message and the S-TMSI, the message being addressed to (a) a C-RNTI previously assigned to the wireless device or (b) the TC-RNTI; and to transmit, to the network node, a Connection Setup Complete message.

Alternatively, the wireless device 1000, 1200 is configured to transmit, to the network node, a RA message comprising an RA preamble; to receive, from the network node, an RAR, comprising a TC-RNTI, and an RA preamble identifier identifying the RA preamble; and to transmit, to the network node, a connection request message comprising a S-TMSI. The wireless device is further configured to receive, from the network node, a RA4 message comprising the temporary identity, an indication that a plurality of connection setup messages will be transmitted, and (I) a C-RNTI for the wireless device, or (II) a new TC-RNTI, wherein the TC-RNTI that previously was received is promoted to be a C-RNTI for the wireless device; and to transmit, to the network node, a Connection Setup Complete message.

Just as described above for the network node, also the wireless device may be implemented or realised in various different ways. A first exemplifying implementation or realisation is illustrated in FIG. 10. FIG. 10 illustrates the wireless device 1000 comprising a processor 1021 and memory 1022, the memory comprising instructions, e.g. by means of a computer program 1023, which when executed by the processor 1021 causes the network node 1000 to perform the methods as described above in conjunction with FIGS. 6a-6c and 8a-8f.

Figure 10:
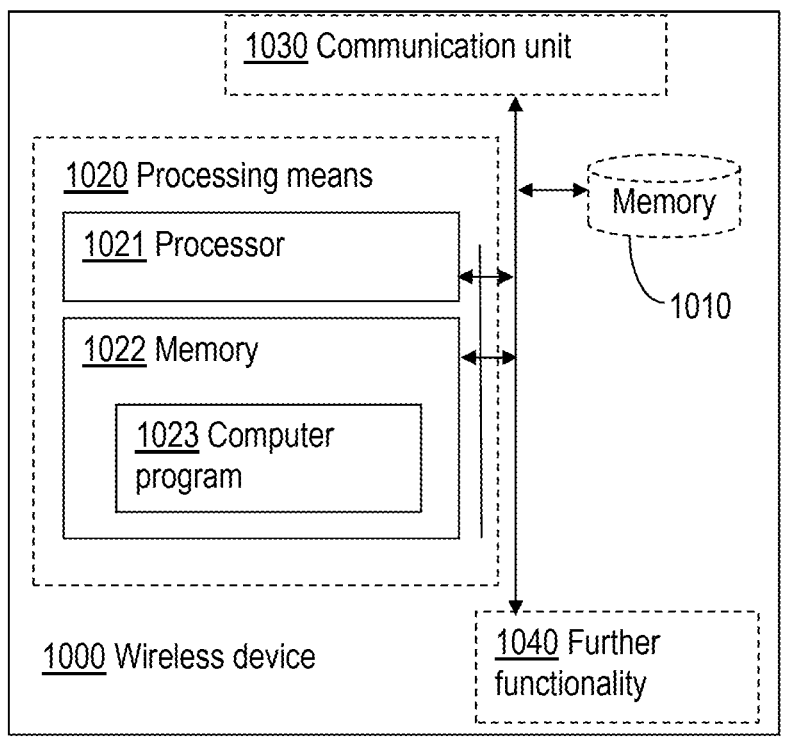
FIG. 10 is a block diagram of a wireless device for use in an RA procedure with a network node in a cell of the network node according to an exemplifying embodiment.

FIG. 10 also illustrates the wireless device 1000 comprising a memory 1010. It shall be pointed out that FIG. 10 is merely an exemplifying illustration and memory 910 may be optional, be a part of the memory 1022 or be a further memory of the wireless device 1000. The memory may for example comprise information relating to the wireless device 1000, to statistics of operation of the wireless device 1000, just to give a couple of illustrating examples. FIG. 10 further illustrates the wireless device 1000 comprising processing means 1020, which comprises the memory 1022 and the processor 1021. Still further, FIG. 10 illustrates the wireless device 1000 comprising a communication unit 1030. The communication unit 1030 may comprise an interface through which the wireless device 1000 communicates with other nodes or entities of the communication network. FIG. 10 also illustrates the wireless device 1000 comprising further functionality 1040. The further functionality 1040 may comprise hardware of software necessary for the wireless device 1000 to perform different tasks that are not disclosed herein.

Figure 12:
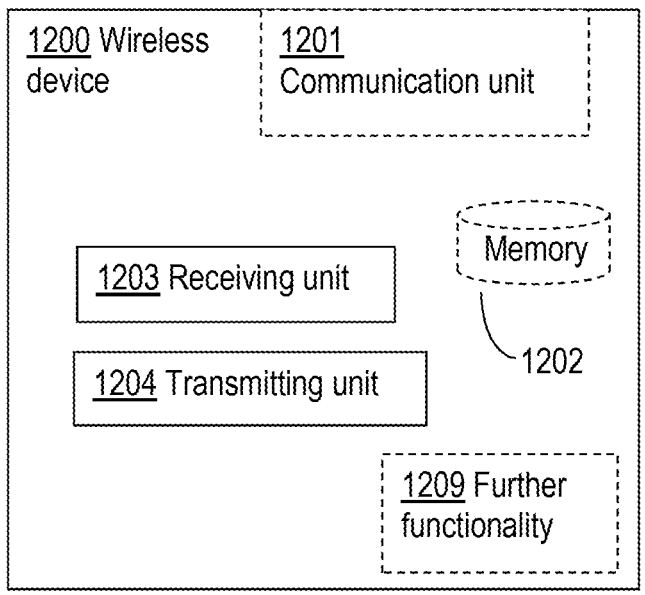
FIG. 12 is a block diagram of a wireless device for use in an RA procedure with a network node in a cell of the network node according to an exemplifying embodiment.

An alternative exemplifying implementation of the wireless device 1000, 1200 is illustrated in FIG. 12. FIG. 12 illustrates the wireless device 1200 comprising a receiving unit 1203 and a transmitting unit 1204 for performing the method as described above in conjunction with FIGS. 6a-6c and 8a-8f, also with reference to FIG. 11 of how the receiving unit and transmitting unit are configured.

In FIG. 12, the wireless device 1200 is also illustrated comprising a communication unit 1201. Through this unit, the wireless device 1200 is adapted to communicate with other nodes and/or entities in the wireless communication network. The communication unit 1201 may comprise more than one receiving arrangement. For example, the communication unit 1201 may be connected to both a wire and an antenna, by means of which the wireless device 1200 is enabled to communicate with other nodes and/or entities in the wireless communication network. Similarly, the communication unit 1201 may comprise more than one transmitting arrangement, which in turn is connected to both a wire and an antenna, by means of which the wireless device 1200 is enabled to communicate with other nodes and/or entities in the wireless communication network. The wireless device 1200 further comprises a memory 1202 for storing data. Further, the wireless device 1200 may comprise a control or processing unit (not shown) which in turn is connected to the different units 1203-1204. It shall be pointed out that this is merely an illustrative example and the wireless device 1200 may comprise more, less or other units or modules which execute the functions of the wireless device 1200 in the same manner as the units illustrated in FIG. 12.

It should be noted that FIG. 12 merely illustrates various functional units in the wireless device 1200 in a logical sense. The functions in practice may be implemented using any suitable software and hardware means/circuits etc. Thus, the embodiments are generally not limited to the shown structures of the wireless device 1200 and the functional units. Hence, the previously described exemplary embodiments may be realised in many ways. For example, one embodiment includes a computer-readable medium having instructions stored thereon that are executable by the control or processing unit for executing the method steps in the wireless device 1200. The instructions executable by the computing system and stored on the computer-readable medium perform the method steps of the wireless device 1200 as set forth in the claims.

The wireless device has the same advantages as the methods performed thereby. One possible advantage is that fewer failed RA access attempts and a reduced radio access latency may be achieved. Since wireless devices which are known to the network may be differentiated by their S-TMSI, their respective stored C-RNTIs may be used to allocate resources to the these wireless devices, thus avoiding access reattempts during a preamble collision for these wireless devices and this frees up the TC-RNTI which can be used for new wireless devices accessing the network. Further, by increasing the contention resolution efficiency, the PRACH capacity may be better utilised and this allows the handling of high RA intensities. This may facilitate traffic prioritisation/handling by the network which may be crucial in high load and emergency scenarios with many wireless devices trying to acquire transmission resources. In addition, the load on the PUSCH, PDSCH, and PDCCH may be reduced. The freed up PRACH, PDCCH, PDSCH and/or PUSCH resources can be used for other data/signalling instead. In this manner, the RAN achieves an overall better resource efficiency and better performance for the wireless devices. Still further, since the PRACH resources may be more efficiently utilised, operators may be allowed to reduce the amount of radio resources allocated for PRACH. Alternatively, further division of the random access preamble space into subgroups may be facilitated, in order to enable signalling of relevant information already with the preamble (i.e. in RA Message 1), such as data volume pending for uplink transmission, estimated channel quality, wireless device category, etc. By using the identities of the wireless devices, e.g. S-TMSI as the temporary identifier, the network node may differentiate wireless devices colliding on the same preamble and allocating C-RNTIs other than the TC-RNTI allows the network node to successively respond to multiple preamble colliding wireless devices. As a result, fewer failed RA access attempts and reduced radio access latency may be achieved. By increasing the contention resolution efficiency, the PRACH capacity is better utilised and this allows the handling of high RA intensities. This facilitates traffic prioritisation/handling by the network which is crucial in high load and emergency scenarios with many wireless devices trying to acquire transmission resources. In addition, the load on the PUSCH, PDSCH, and PDCCH may be reduced. The freed up PRACH, PDCCH, PDSCH and/or PUSCH resources may be used for other data/signalling instead. In this manner, the RAN achieves an overall better resource efficiency and better performance for the wireless devices.

Figure 13:
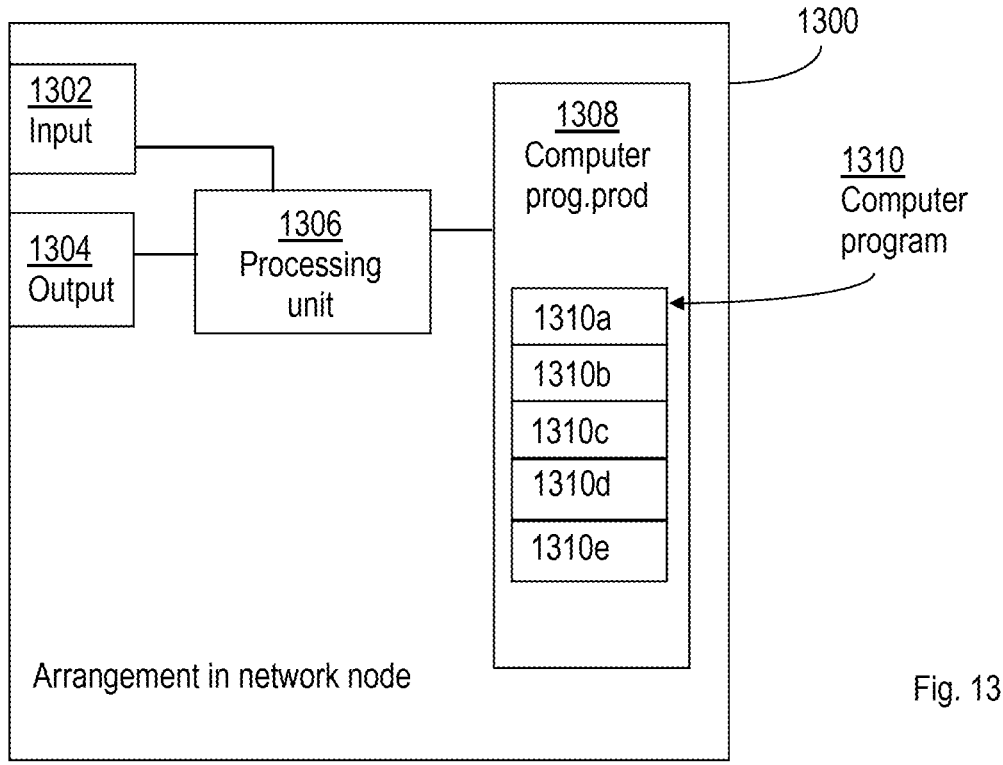
FIG. 13 is a block diagram of an arrangement in a network node for use in an RA procedure with wireless devices in a cell of the network node according to an exemplifying embodiment.

FIG. 13 schematically shows an embodiment of an arrangement 1300 in a network node 1100. Comprised in the arrangement in the network node are here a processing unit 1306, e.g. with a Digital Signal Processor, DSP. The processing unit 1306 may be a single unit or a plurality of units to perform different actions of procedures described herein. The arrangement 1300 in the network node 1100 may also comprise an input unit 1302 for receiving signals from other entities, and an output unit 1304 for providing signal(s) to other entities. The input unit and the output unit may be arranged as an integrated entity or as illustrated in the example of FIG. 11, as one or more interfaces 1101.

Furthermore, the arrangement 1300 in the network node 1100 comprises at least one computer program product 1308 in the form of a non-volatile memory, e.g. an Electrically Erasable Programmable Read-Only Memory, EEPROM, a flash memory and a hard drive. The computer program product 1308 comprises a computer program 1310, which comprises code means, which when executed in the processing unit 1306 in the arrangement in the network node causes the network node to perform the actions e.g. of the procedure described earlier in conjunction with FIGS. 5*a*-5*c* and/or 7*a*-7*b*.

Figure 5B:
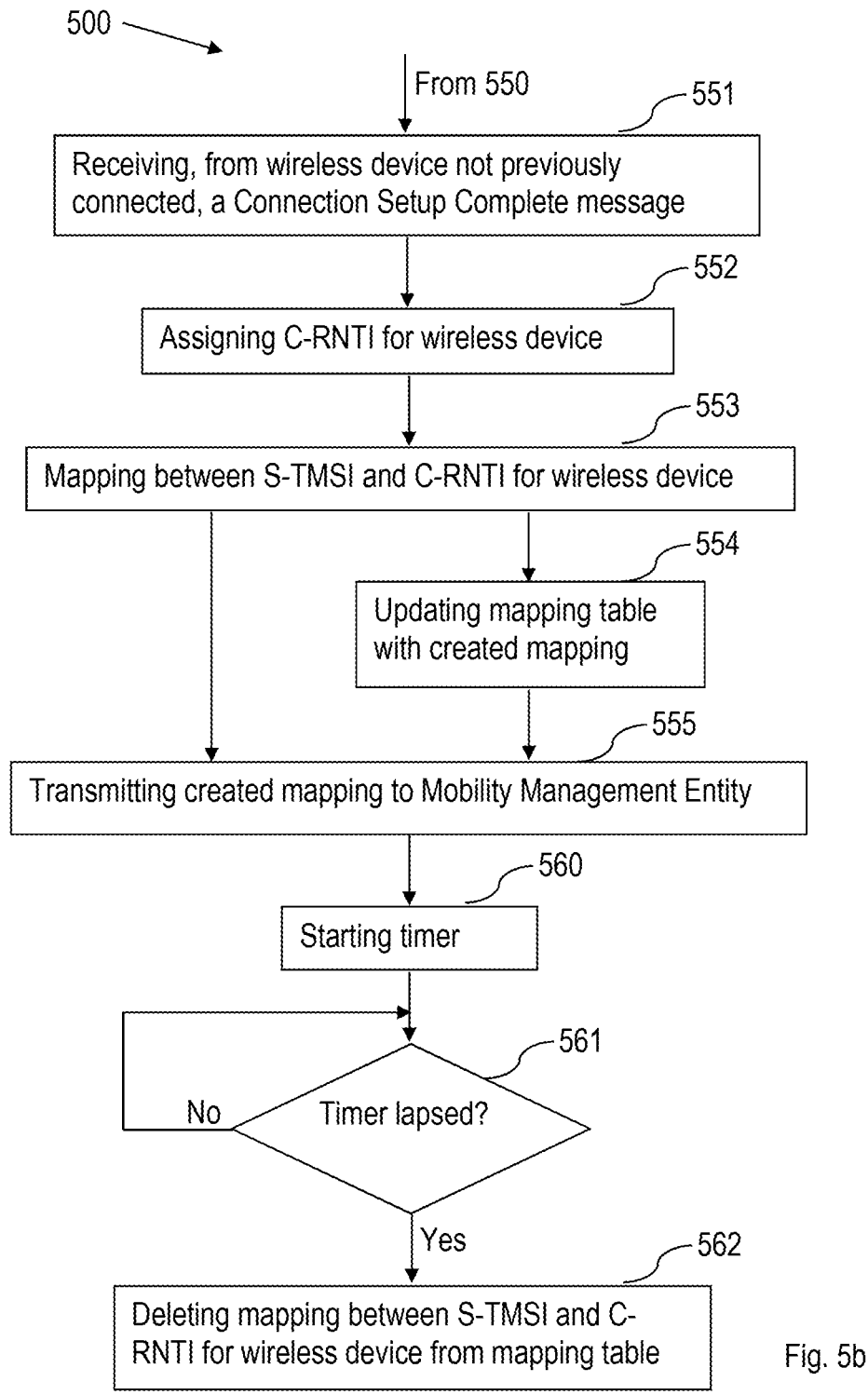
FIG. 5b is a flowchart of a method performed by a network node for use in an RA procedure with wireless devices in a cell of the network node according to yet an exemplifying embodiment.
Figure 5C:
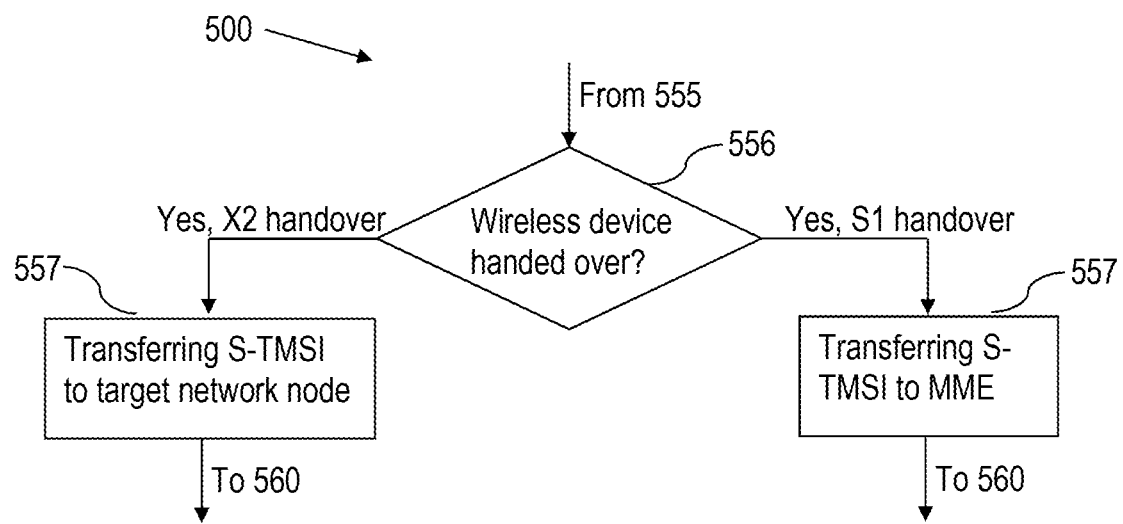
FIG. 5c is a flowchart of a method performed by a network node for use in an RA procedure with wireless devices in a cell of the network node according to still an exemplifying embodiment.

The computer program modules could essentially perform the actions of the flow illustrated in FIGS. 5*a*-5*c* and/or 7*a*-7*b*, to emulate the network node 1100. In other words, when the different computer program modules are executed in the processing unit 1306, they may correspond to the units 1103-1104 of FIG. 11.

Figure 14:
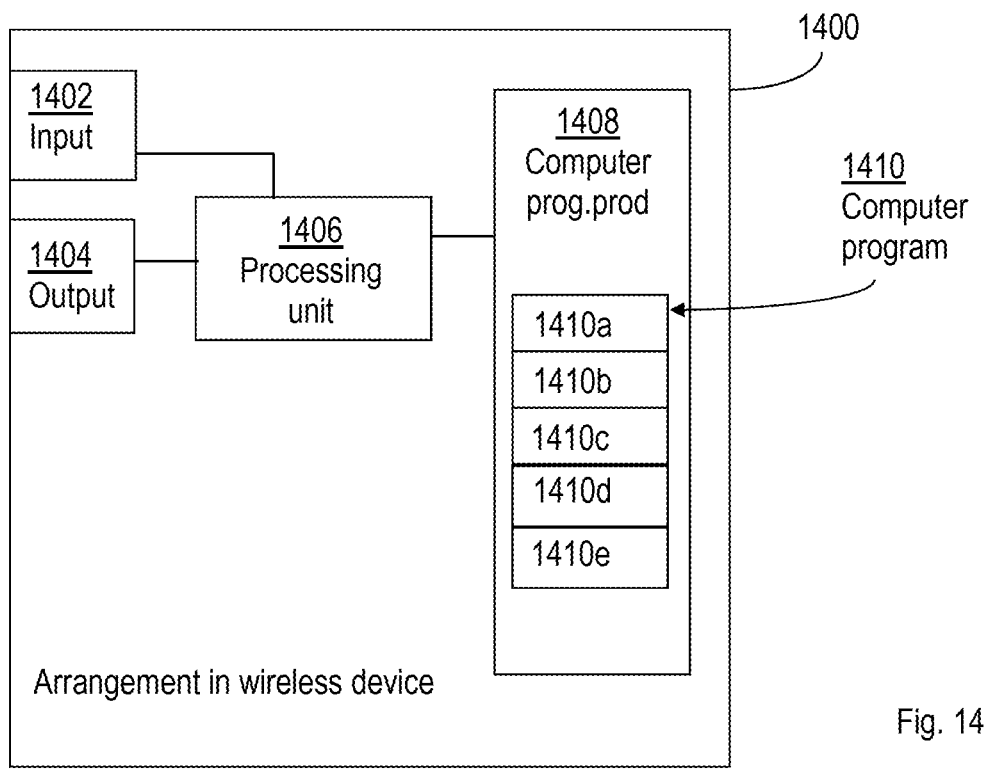
FIG. 14 is a block diagram of an arrangement in a wireless device for use in an RA procedure with a network node in a cell of the network node according to an exemplifying embodiment.

FIG. 14 schematically shows an embodiment of a wireless device 1400. Comprised in the arrangement 1400 in the wireless device are here a processing unit 1406, e.g. with a Digital Signal Processor. The processing unit 1406 may be a single unit or a plurality of units to perform different actions of procedures described herein. The wireless device 1400 may also comprise an input unit 1402 for receiving signals from other entities, and an output unit 1404 for providing signal(s) to other entities. The input unit and the output unit may be arranged as an integrated entity or as illustrated in the example of FIG. 12, as one or more interfaces 1201.

Furthermore, the arrangement 1400 in the wireless device comprises at least one computer program product 1408 in the form of a non-volatile memory, e.g. an Electrically Erasable Programmable Read-Only Memory, EEPROM, a flash memory and a hard drive. The computer program product 1408 comprises a computer program 1410, which comprises code means, which when executed in the processing unit 1406 in the arrangement 1400 in the second wireless device causes the second wireless device 1200 to perform the actions e.g. of the procedure described earlier in conjunction with FIGS. 6*a*-6*c* and/or 8*a*-8*f*.

Figure 6B:
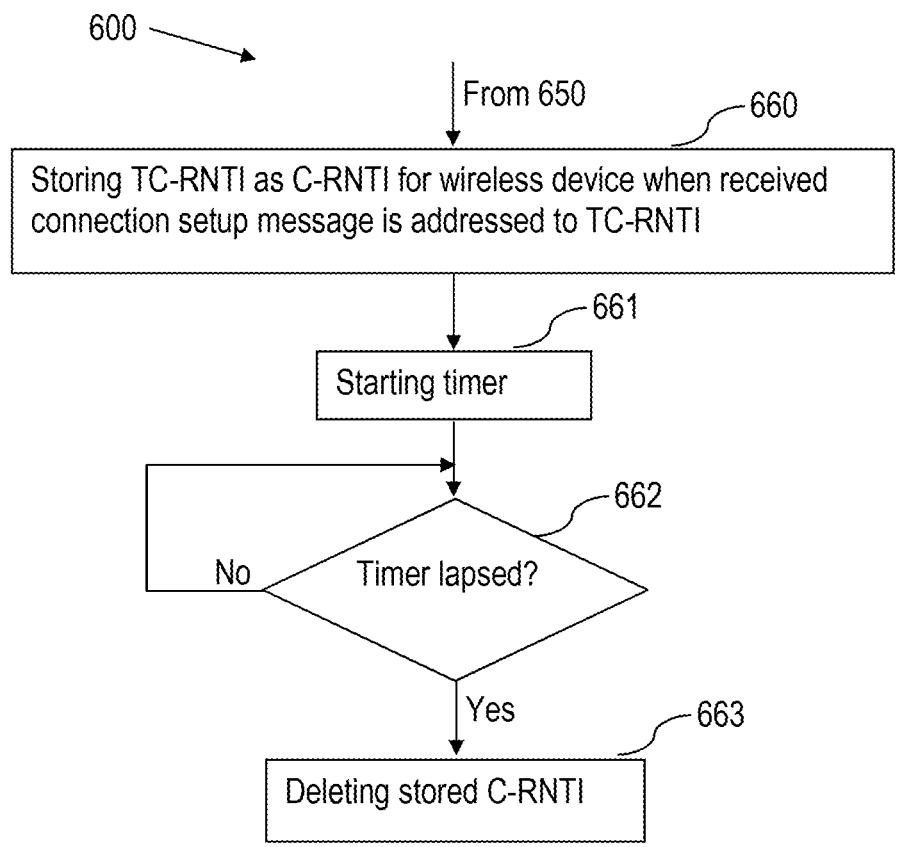
FIG. 6b is a flowchart of a method performed by wireless device for use in an RA procedure with a network node in a cell of the network node according to yet an exemplifying embodiment.
Figure 6C:
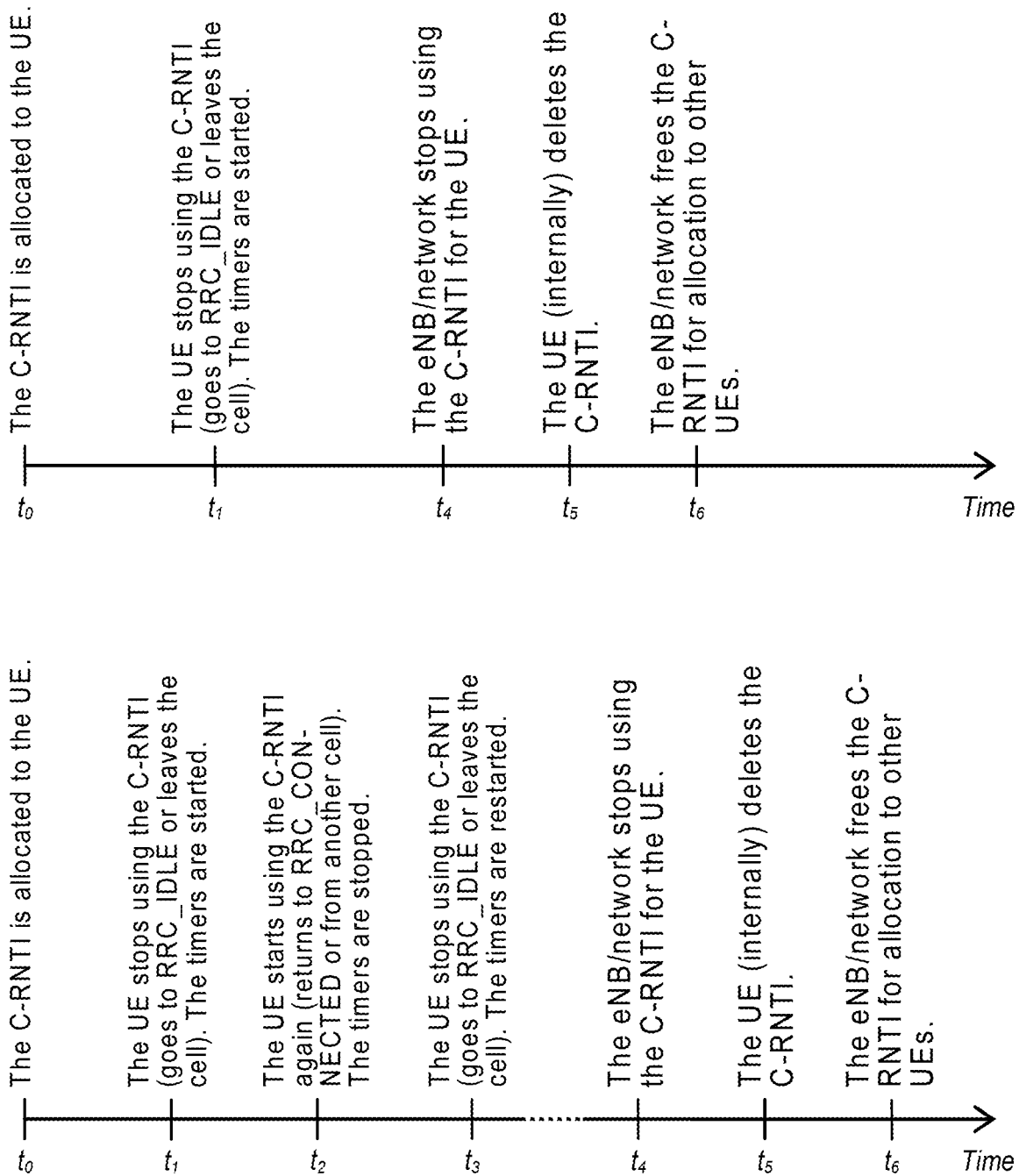
FIG. 6c is an illustration of a timeline of how different timers and guard times may be used to avoid disadvantageous consequences of imperfect timer synchronisation.

The computer program modules could essentially perform the actions of the flow illustrated in FIGS. 6*a*-6*c* and/or 8*a*-8*f*, to emulate the wireless device 1200. In other words, when the different computer program modules are executed in the processing unit 1406, they may correspond to the units 1203-1204 of FIG. 12.

Although the code means in the respective embodiments disclosed above in conjunction with FIGS. 11 and 12 are implemented as computer program modules which when executed in the respective processing unit causes the network node and the wireless device respectively to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the network node and the wireless device respectively.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A network node for performing a Random Access, RA, procedure with wireless devices in a cell of the network node, the network node comprising:
   a processor; and
   a memory, the processor and the memory configured to:
      receive, from at least two wireless devices, an RA message comprising an RA preamble;
      transmit an RA Response, RAR, to the at least two wireless devices, the RAR comprising a Temporary Cell Radio Network Temporary Identifier, TC-RNTI, and an RA preamble identifier identifying the received RA preamble;
      receive, from each of the at least two wireless devices, a connection request message comprising a respective System Architecture Evolution, SAE Temporary Mobile Subscriber Identity, S-TMSI;
      determine whether a wireless device of the at least two wireless devices was previously connected to the network node in a same cell, by determining if a mapping exists, in a mapping table, between the S-TMSI and the CRNTI;
      if the wireless device is determined to have been previously connected to the network node in the same cell, transmit a connection setup message addressed to a C-RNTI previously assigned to the wireless device; and
      if the wireless device is determined to not have been previously connected to the network node in the same cell, transmit a connection setup message addressed to the TC-RNTI,
   wherein the processor and the memory are further configured to
      prioritize between wireless devices when receiving, from each of the at least two wireless devices, the connection request message comprising a respective S-TMSI, wherein the prioritization is based on at least one of (a) establishment cause, (b) estimated channel quality, (c) estimated timing advance, and (d) travelling speed of the wireless device.

2. The network node according to claim 1, wherein the processor and the memory are further configured to assign a C-RNTI to the wireless device not previously connected to the network node in the same cell and create a mapping between the S-TMSI and the C-RNTI for the wireless device.

3. The network node according to claim 2, wherein the processor and the memory are further configured to start a timer, and when the timer lapses, delete the mapping between the S-TMSI and the C-RNTI for that wireless device from the mapping table.

4. A network node for performing a Random Access, RA, procedure with at least one wireless device in a cell of the network node, the network node comprising;
   a processor; and
   a memory, the processor and the memory configured to:
      receive, from at least two wireless devices, an RA message comprising an RA preamble;
      transmit an RA Response, RAR, to the at least two wireless devices, the RAR comprising a Temporary Cell Radio Network Temporary Identifier, TC-RNTI and an RA preamble identifier identifying the received RA preamble;
      as a result of the transmitted RAR, receive connection request messages from the at least two wireless devices;
      responsive to at least one of the received connection request messages, transmit:
      a respective RA4 message to a respective wireless device comprising the respective temporary identity for the wireless device that sent the connection request message;
      an indication that a plurality of subsequent RA4 messages will be transmitted to each of the at least two wireless devices in response to the received connection request messages; and at least one of (I) a C-RNTI for the wireless device whose temporary identity is comprised in the RA4 message, and (II) a new TC-RNTI, the temporary identity in the respective RA4 message and the indication of the plurality of subsequent RA4 messages being configured to indicate:
      which one of the at least two wireless devices the one of the C-RNTI and the new TC-RNTI is intended for; and
      that an additional subsequent RA4 messages is to be expected for other ones of the at least two wireless devices that the one of the C-RNTI and the new TC-RNTI is not intended for; and
      the TC-RNTI that previously was transmitted being promoted to be a C-RNTI for the wireless device whose temporary identity is comprised in the RA4 message,
   wherein the processor and the memory are further configured to
      prioritize between wireless devices when receiving, from each of the at least two wireless devices, the connection request message comprising a respective S-TMSI, wherein the prioritization is based on at least one of (a) establishment cause, (b) estimated channel quality, (c) estimated timing advance, and (d) travelling speed of the wireless device.

5. The network node according to claim 4, wherein the processor and the memory are further configured to, for one of the received connection request message, transmit a RA4 message comprising the temporary identity for the wireless device that sent the connection request message, wherein the TC-RNTI that was previously sent in the RAR is promoted to be a C-RNTI for the wireless device whose temporary identity is comprised in the RA4 message.

6. The network node according to claim 4, wherein the indication that the plurality of subsequent RA4 messages will be transmitted comprises a flag.

7. The network node according to claim 6, wherein the flag comprises one of: an indication of a period of time that the at least one wireless device is to listen for the additional subsequent RA4 message; a number indicating a number of following subsequent RA4 messages; and a list of the temporary identities of the remaining at least one wireless device which the network node will respond to with at least one subsequent RA4 message.

8. The network node according to claim 4, wherein the processor and the memory are further configured to, when transmitting a RA4 message to a respective wireless device, include an indication that no further RA4 messages will be sent.

* * * * *